United States Patent
Na et al.

(10) Patent No.: US 10,357,844 B2
(45) Date of Patent: Jul. 23, 2019

(54) METHOD OF MONITORING OF RESISTANCE WELDING QUALITY OF NUCLEAR FUEL ROD

(71) Applicants: KEPCO NUCLEAR FUEL CO., LTD., Daejeon (KR); MONITECH CO., LTD., Busan (KR)

(72) Inventors: Tae Hyung Na, Daejeon (KR); Dong Soo Hwang, Busan (KR); Mi Hye Ko, Yangsan-si (KR); Kyung Woo Choi, Gimhae-si (KR)

(73) Assignees: KEPCO NUCLEAR FUEL CO., LTD., Daejeon (KR); MONITECH CO., LTD., Busan (KR)

( * ) Notice: Subject to any disclaimer, the term of this patent is extended or adjusted under 35 U.S.C. 154(b) by 299 days.

(21) Appl. No.: 15/298,391

(22) Filed: Oct. 20, 2016

(65) Prior Publication Data
US 2017/0291249 A1   Oct. 12, 2017

(30) Foreign Application Priority Data
Apr. 12, 2016   (KR) .......................... 10-2016-0045170

(51) Int. Cl.
*B23K 11/00* (2006.01)
*B23K 11/25* (2006.01)
(Continued)

(52) U.S. Cl.
CPC .......... *B23K 11/255* (2013.01); *B23K 11/002* (2013.01); *B23K 11/0935* (2013.01);
(Continued)

(58) Field of Classification Search
CPC ... B23K 11/002; B23K 11/255; B23K 11/257; B23K 11/258; B23K 11/25; G21C 3/10; G21C 21/02
See application file for complete search history.

(56) References Cited

U.S. PATENT DOCUMENTS

| 5,434,382 A | | 7/1995 | Schlattl et al. | |
| 6,140,825 A | * | 10/2000 | Fujii | B23K 11/256 219/110 |
| 6,172,888 B1 | * | 1/2001 | Jochi | B23K 11/258 363/89 |

(Continued)

FOREIGN PATENT DOCUMENTS

| CN | 104520936 A | 4/2015 |
| JP | 2002-178158 A | 6/2002 |

(Continued)

*Primary Examiner* — Jennifer E Simmons
*Assistant Examiner* — Leo T Hinze
(74) *Attorney, Agent, or Firm* — Rabin & Berdo, P.C.

(57) ABSTRACT

A method of monitoring in real time pressure resistance welding of a cladding tube and an end plug. The method includes: a first step of detecting welding information including voltage, current, and welding force in a process of pressure resistance welding of a cladding tube and an end plug; a second step of comparing static factors obtained by calculating effective values for the welding information with predetermined reference values, respectively; a third step of calculating dynamic factors for the welding information including the gradient of instantaneous welding force, when the reference values are satisfied in the second step; and a fourth step of determining whether there is defect or not in welding quality by comparing the dynamic factors.

7 Claims, 23 Drawing Sheets

(51) Int. Cl.
*B23K 11/093* (2006.01)
*G21C 21/02* (2006.01)
*G21C 3/334* (2006.01)
*G21C 3/10* (2006.01)

(52) U.S. Cl.
CPC ......... *B23K 11/252* (2013.01); *B23K 11/257* (2013.01); *B23K 11/258* (2013.01); *G21C 3/334* (2013.01); *G21C 21/02* (2013.01); *G21C 3/10* (2013.01); *Y02E 30/40* (2013.01)

(56) References Cited

U.S. PATENT DOCUMENTS

| | | | |
|---|---|---|---|
| 2012/0118861 A1 | 5/2012 | Haeufgloeckner et al. | |
| 2013/0248505 A1* | 9/2013 | Anayama | B23K 11/115 219/130.01 |
| 2013/0272484 A1* | 10/2013 | Lee | G21C 3/10 376/451 |
| 2014/0183168 A1* | 7/2014 | Arndt | B23K 11/255 219/86.51 |
| 2015/0108100 A1* | 4/2015 | Haeufgloeckner | B23K 31/125 219/109 |

FOREIGN PATENT DOCUMENTS

| | | |
|---|---|---|
| JP | 2011-011253 A | 1/2011 |
| KR | 10-2003-0083650 A | 10/2003 |
| KR | 10-2014-0014570 A | 2/2014 |
| KR | 10-1390385 B1 | 4/2014 |
| KR | 10-1542471 B1 | 8/2015 |
| KR | 10-2015-0144138 A | 12/2015 |
| RU | 2 164 846 C1 | 4/2001 |
| SU | 515612 A1 | 5/1976 |
| SU | 1801713 A1 | 3/1990 |

* cited by examiner

METHOD OF MONITORING OF RESISTANCE WELDING QUALITY OF NUCLEAR FUEL ROD

BACKGROUND OF THE INVENTION

Field of the Invention

The present invention relates to a method of monitoring resistance welding quality of a nuclear fuel rod, particularly, a method that can monitor in real time the quality of pressure resistance welding of a cladding tube and an end plug.

Description of the Related Art

A nuclear fuel rod for a light water reactor is manufactured by putting a plurality of pellets into a cylindrical cladding tube made of a zirconium alloy and then welding both ends of the cladding tube with end plugs.

A plurality nuclear fuel rods is integrally supported in spacer grids and put into a reactor as a fuel assembly, so rough surfaces of the nuclear fuel rods are polished to prevent interference with the spacer grids in assembling.

In general, pressure resistance welding is used for welding a cladding tube and an end plug, that is, a cladding tube and an end plug are pressed by a pair of electrodes and current is applied from one of the electrodes to the other electrode through the cladding tube and the end plug, thereby permanently welding the cladding tube and the end plug.

A burst test and a structural examination of fuel rods in a batch are performed for inspection of resistance welding of end caps of fuel rods, but there is a need for a quick and accurate quality estimation to increase reliability of the welding process.

A method of estimating welding quality that can check welding quality in real time by detecting and analyzing parameters such as voltage, current, and welding force in welding has been used in some cases in the related art.

DOCUMENTS OF RELATED ART

[Patent Document 1] Korean Patent Application Publication No. 2003-0083650 (2003.10.30)
[Patent Document 2] Korean Patent Application Publication No. 10-2014-0014570 (2014.02.06) [Patent Document 3] Korean Patent Application Publication No. 10-2015-0144138 (2015.12.24)

SUMMARY OF THE INVENTION

The present invention has been made in an effort to solve the problems and an object of the present invention is to provide a method of accurately and quickly monitoring welding quality of pressure resistance welding for a cladding tube and an end plug.

In order to achieve the above object, according to one aspect of the present invention, there is provided a method of monitoring resistance welding quality of a nuclear fuel rod, the method including: a first step of detecting welding information including voltage, current, and welding force in a process of pressure resistance welding of a cladding tube and an end plug; a second step of comparing static factors obtained by calculating effective values for the welding information with predetermined reference values, respectively; a third step of calculating dynamic factors for welding information including a gradient of instantaneous welding force; and a fourth step of determining whether there is defect or not in welding quality by comparing the dynamic factors.

The gradient of instantaneous welding force may be the gradient of welding force at a first half cycle of supplied power.

The fourth step may be performed on the basis of a total sum of values obtained by quantifying patterns of the dynamic factors.

The quantified values for the dynamic factors are weighted.

The method of monitoring resistance welding quality of a nuclear fuel rod according to the present invention can detect welding information including voltage, current, and welding force, calculate specific dynamic factors and static factors from the welding information, and quickly and accurately determine whether there is defect or not in welding quality on the basis of the factors. In particular, it is possible to more accurately and reliably determine a defect in welding quality using the gradient of instantaneous welding force, which is one of the dynamic factors.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Specific structures and functions stated in the following embodiments of the present invention are exemplified to illustrate embodiments according to the spirit of the present invention and the embodiments according to the spirit of the present invention can be achieved in various ways. Further, the present invention should not be construed as being limited to the following embodiments and should be construed as including all changes, equivalents, and replacements included in the spirit and scope of the present invention.

Terms including "first" and/or "second" used herein may be used to describe various components, but the components are not limited to the terms. The terms are used to distinguish one component from another component, and for instance, a first component may be referred to as a second component, and similarly, a second component may be referred to as a first component without being depart from the scope according to the spirit of the present invention.

It should be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "connected directly with" another element, it may be connected to or coupled to another element without the other element intervening therebetween. Other expressions describing the relationships of components, that is, "between" and "directly between", or "close to" and "directly close to" should be understood in the same way.

Hereinafter, embodiments of the present invention will be described hereafter in detail with reference to the accompanying drawings.

Figure 1A:
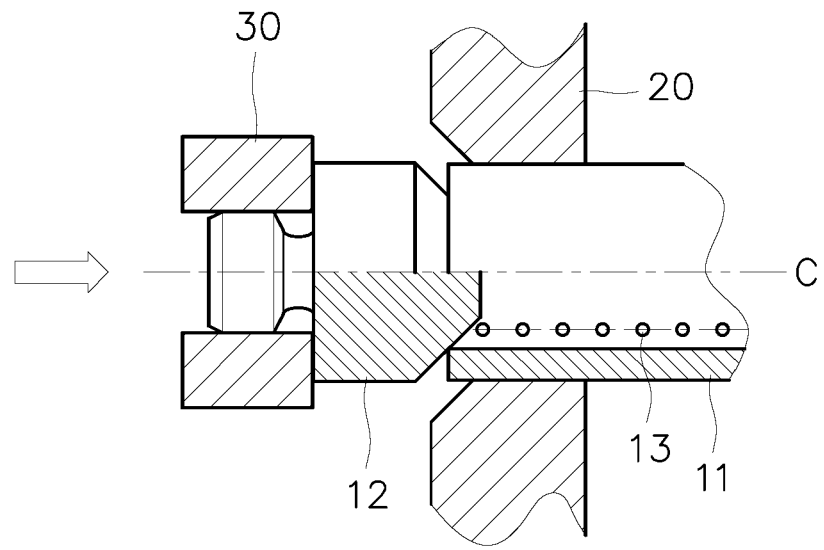
FIGS. 1A and 1B are views showing a main configuration before and after welding by a pressure resistance welding apparatus for a nuclear fuel rod.
Figure 1B:
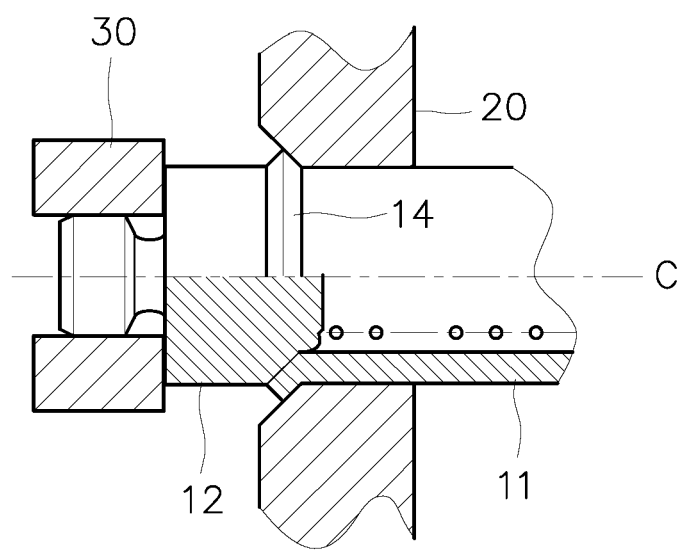

Referring to FIGS. 1A and 1B, a resistance welding apparatus for a nuclear fuel rod includes a tube electrode 20 in which a cladding tube 11 and a plug electrode 30 that can horizontally move with respect to the tube electrode 20, in which the plug electrode 30 fixes and supports an end plug 12 such that the eng plug 12 is aligned on the longitudinal axis C of the cladding tube 11. Reference numeral '13' indicates a spring elastically support a pellet in the cladding tube.

The plug electrode 30 can be moved forward/backward by a carrier body (not shown), resistance welding is performed on the cladding tube 11 and the end plug 12 by welding current applied between the tube electrode 20 and the plug electrode 30 with the plug electrode 30 pushed forward, and a welding bead 14 protruding in a ring shape is formed at the welded portion.

A monitoring system of the present invention determines whether it is poor welding or not by detecting and analyzing welding information such as current, voltage, and welding force while pressure welding is performed on the cladding tube and the end plug, as described above.

In detail, reasons for 'non-welded portion' and 'welded-portion crack' that may be caused during resistance welding of a nuclear fuel rod may be divided in accordance with defect types, that is, 1) mechanical defect of a resistance welding apparatus, 2) defect of an electrode, and 3) defect of a material.

For example, the mechanical defect of resistance welding apparatus (1) may be due to poor welding due to breakage of an electrode-carrying cylinder lever. The electrode-carrying cylinder lever plays a very important role in welding by fixing a tube electrode and a cladding tube, but even if fatigue failure occurs due to a repeated load, it is difficult to determine the fatigue failure. Further, other mechanical defects may include loosening of a bus bar connecting an electrode and an electrical element, oxidation of a cable, and malfunction of mechanical parts related to a pressing speed of an electrode cylinder.

The defect of an electrode (2) may be caused by existence or defect of an insulator and the diameter of an electrode hole due to outer diameter tolerance of a cladding tube.

The defect of a material (3) may be caused by various reasons such as machining tolerance of a cladding tube, buckling of a spring inserted in a nuclear fuel rod, poor surface machining at an end of a spring, and whether a spring is plated or not.

The present invention nondestructively determines poor quality in real time by finding out representative quality factors for defect reasons that may be generated during resistance welding of a nuclear fuel rod.

Figure 2:
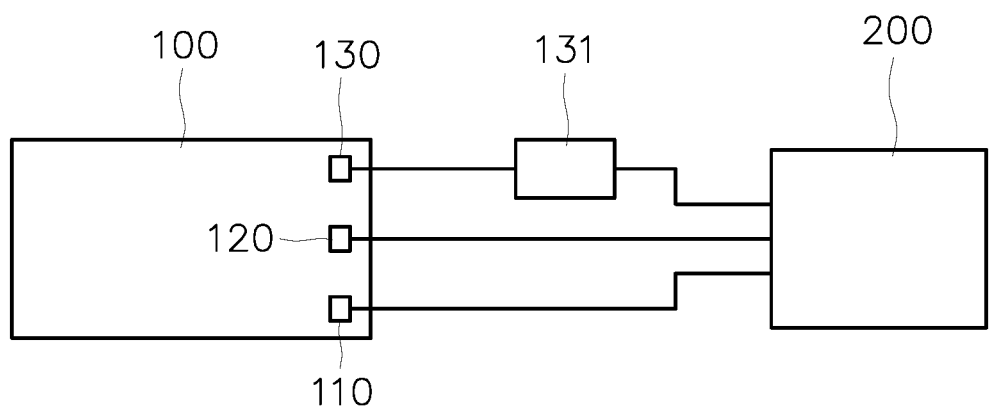
FIG. 2 is a view showing the configuration of a monitoring system of the present invention.

Referring to FIG. 2, a monitoring system of the present invention includes a current sensor 110 for detecting welding current, a voltage sensor 120 for detecting welding voltage, and a welding force sensor 130 for detecting welding force applied to an end plug in welding, so it measures in real time the waveforms of current, voltage, and welding force.

The current sensor 110 can measure welding current using a sensor such as a toroidal coil and the welding force sensor 130 may be a common load cell. A signal processor such as a welding force indicator 131 may be provided for the welding force sensor 130.

Output signals from the current sensor 110, the voltage sensor 120, and the welding force indicator 131 are transmitted to a monitoring unit 200 and the monitoring unit 200 monitors welding quality in real time by processing detected signals (waveforms etc.).

The monitoring unit 200 can calculate welding time with welding information detected by the sensors and the welding time can be calculated from the time for which current flows.

In detail, the monitoring unit 200 in this embodiment can estimate welding quality of a fuel rod using the following quality factors.

(P1) Current: Effective current of all of detected waveform (P2) Voltage: Effective voltage of all of detected waveform (P3) Entire average dynamic resistance: Average of dynamic resistance of all waveforms (P4) Entire average heating value: Average of heating value of all waveforms (BW0) Interval dynamic resistance: Average of dynamic resistance of waveform as specific period (BW1) Gradient of instantaneous dynamic resistance: Gradient of instantaneous dynamic resistance per half cycle (BW2) Gradient of instantaneous welding force: Gradient of welding force at first half cycle The average dynamic resistance can be calculated from current and voltage and the heating value can be calculated from voltage X current$^2$×welding time. The information about the heating value may be obtained by a heat value sensor that can directly measure a heating value by detecting the temperature of a welded portion.

In this embodiment, instantaneous dynamic resistance (IDR) is calculated from the instantaneous value of current, which is measured in accordance with a predetermined sampling cycle for each half cycle of a single-phase AC power for welding time, and the instantaneous value of voltage synchronized with the instantaneous value of the current, which is expressed as the following Equation 1.

$$\text{IDR} = \text{Instantaneous value of voltage } (V_j)/\text{Instantaneous value of current } (I_j) \quad \text{[Equation 1]}$$

Figure 3A:
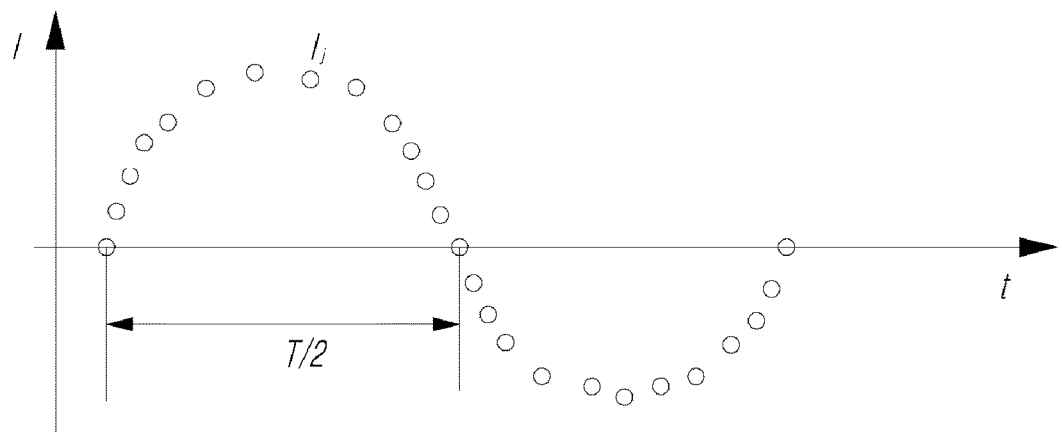
FIGS. 3A to 3C are graphs illustrating instantaneous dynamic resistance (IDR) and interval dynamic resistance according to an embodiment of the present invention.
Figure 3B:
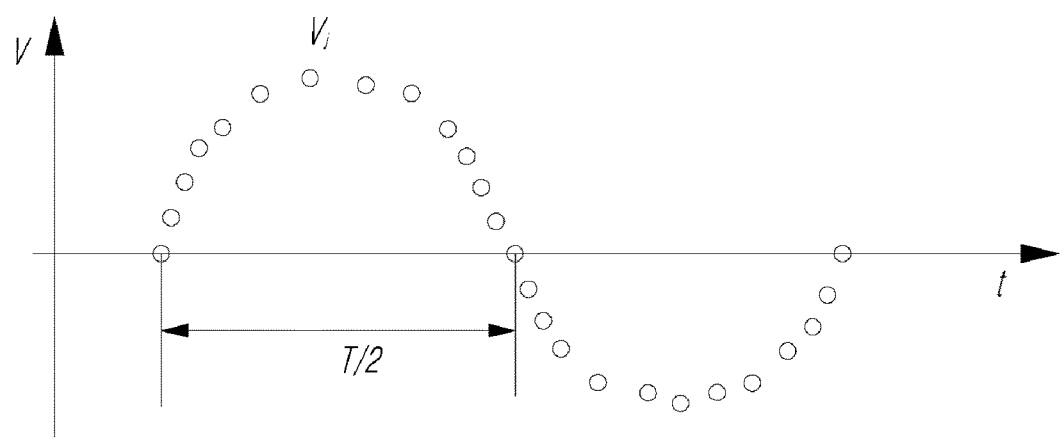
Figure 3C:
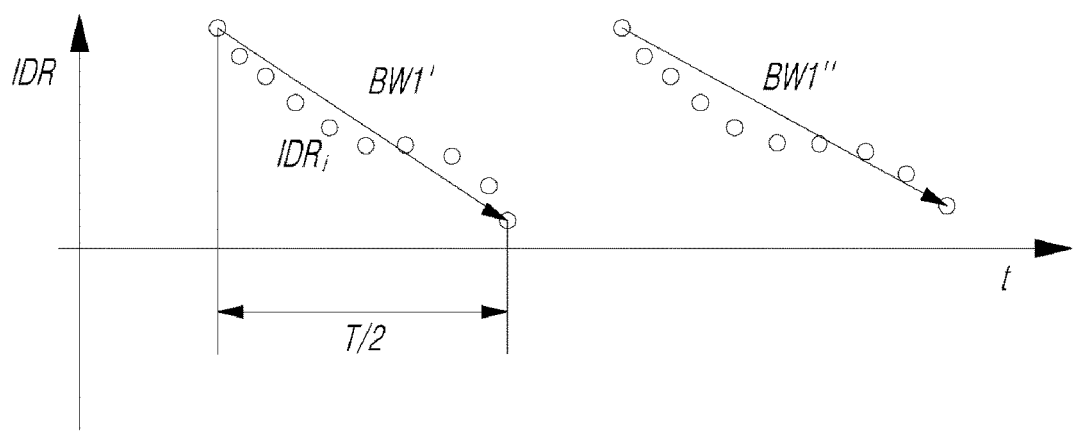

FIGS. 3A to 3C are graphs illustrating instantaneous dynamic resistance (IDR) and interval dynamic resistance according to an embodiment of the present invention.

In detail, referring to FIGS. 3A to 3C, instantaneous current Ij and instantaneous voltage Vj are measured at each predetermined sampling cycle for a half cycle (T) of supplied power, in which the instantaneous current Ij and the instantaneous voltage Vj, which are instantaneously detected data at each sampling cycle, are measured at the same time in the same number.

The instantaneous dynamic resistance (IDR) is a dynamic resistance value determined by the instantaneous current Ij and the instantaneous voltage Vj, the entire average dynamic resistance P3 means the average of the dynamic resistance of all waveforms, and the interval dynamic resistance BW0 means the average of the dynamic resistance of waveforms at a specific period. In this embodiment, the interval dynamic resistance BW0 means a resistance value calculated from the effective current and the effective voltage for a half cycle (T/2) of supplied power, and it should be understood that the interval dynamic resistance BW0 is different from the entire average dynamic resistance P3.

The gradient of instantaneous dynamic resistance BW1 means the gradient of the instantaneous dynamic resistance (IDR) sampled at each half cycle, and accordingly, two gradients of instantaneous dynamic resistance BW1' and BW1'' can be obtained for one cycle (T). It is possible to use the gradient of instantaneous dynamic resistance BW1 to determine welding quality by comparing it with a reference value, and the welding quality may be determined by comparing the minimum of a plurality of gradients of instantaneous dynamic resistance BW1' and BW1'' with the reference value.

Figure 4:
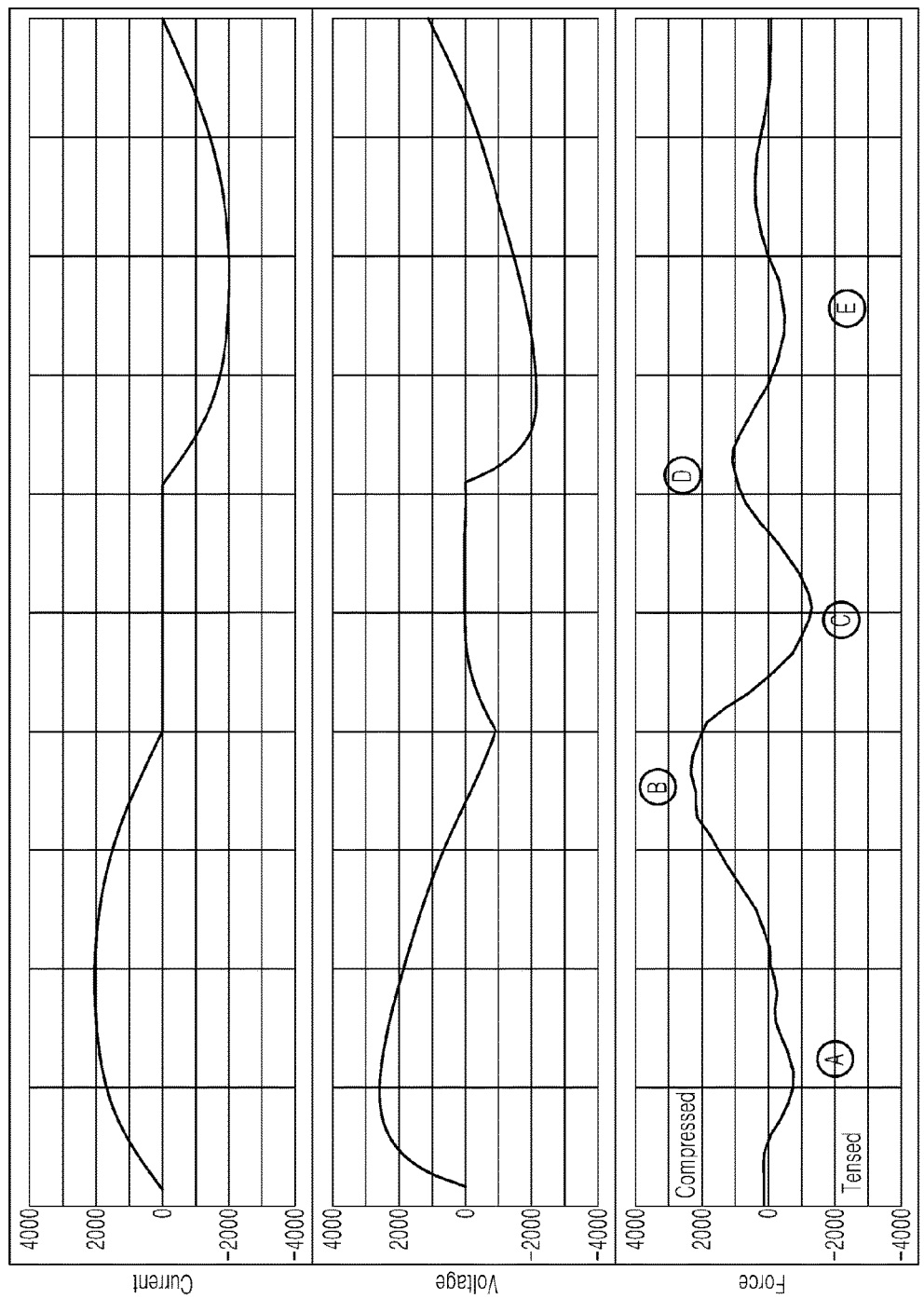
FIG. 4 is a graph showing current, voltage, and welding force waveforms detected during resistance welding according to an embodiment of the present invention.

FIG. 4 is a graph showing current, voltage, and welding force waveforms detected during resistance welding according to an embodiment of the present invention.

Referring to FIG. 4, a welding force waveform can be divided into five periods A, B, C, D, and E, and in the welding force graph, '+' means compressive force and '−' means tensile force.

For reference, the gradient of instantaneous welding force that is a quality factor described above means the gradient of welding force at the first half cycle in detected instantaneous welding force.

Figure 5A:
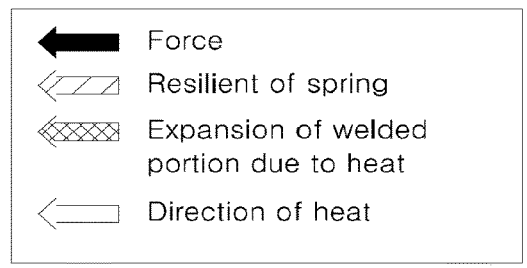
FIGS. 5A to 5F are views simply showing the states of a cladding tube and an end plug in each pressing period during resistance welding according to an embodiment of the present invention.
Figure 5A:
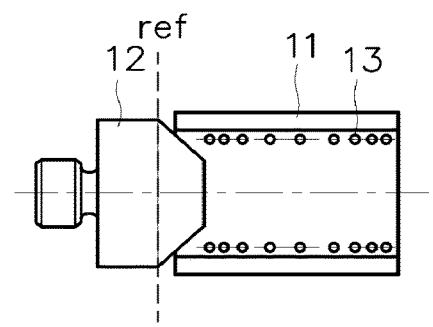
Figure 5B:
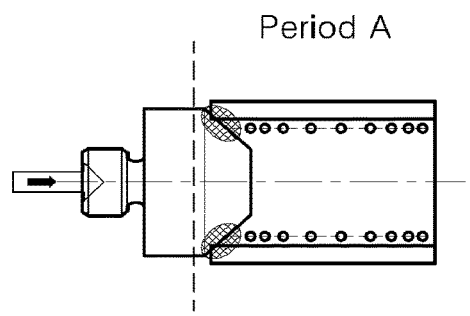
Figure 5C:
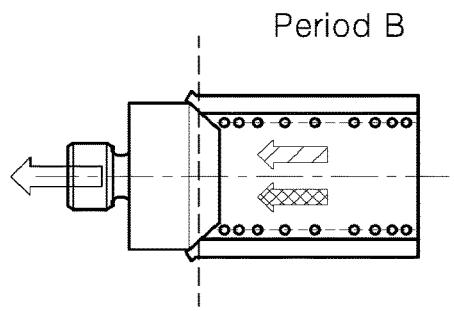
Figure 5D:
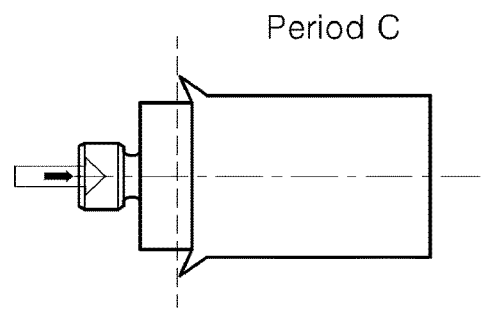
Figure 5E:
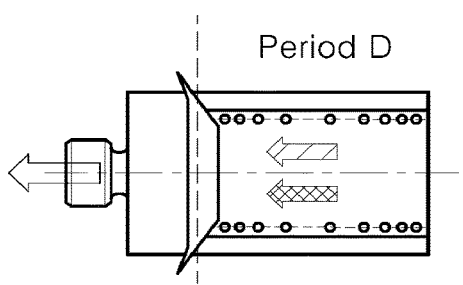

FIGS. 5A to 5F are views simply showing the states of a cladding tube and an end plug in each pressing period during resistance welding according to an embodiment of the present invention, in which FIG. 5A shows the state before welding, where the initial position of an end plug 12 is indicated by reference line ref.

Figure 5F:
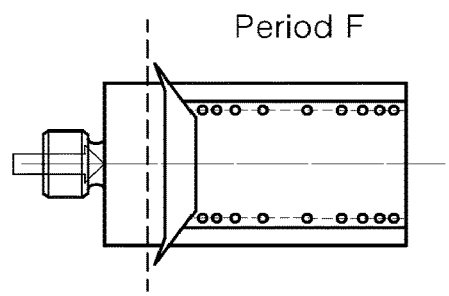
Figure 6A:
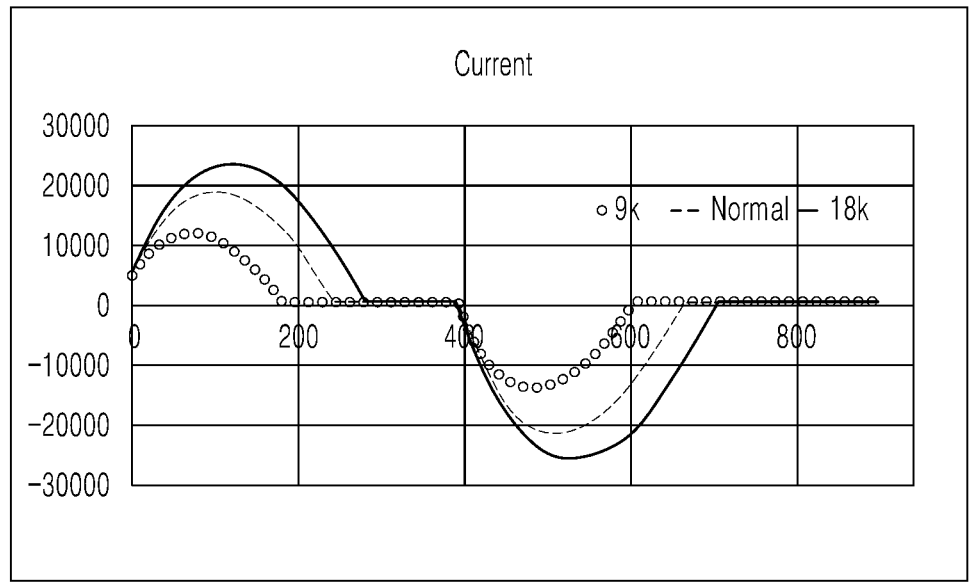
FIGS. 6 to 13 are graphs showing patterns of quality factors in resistance welding under predetermined test conditions.
Figure 6B:
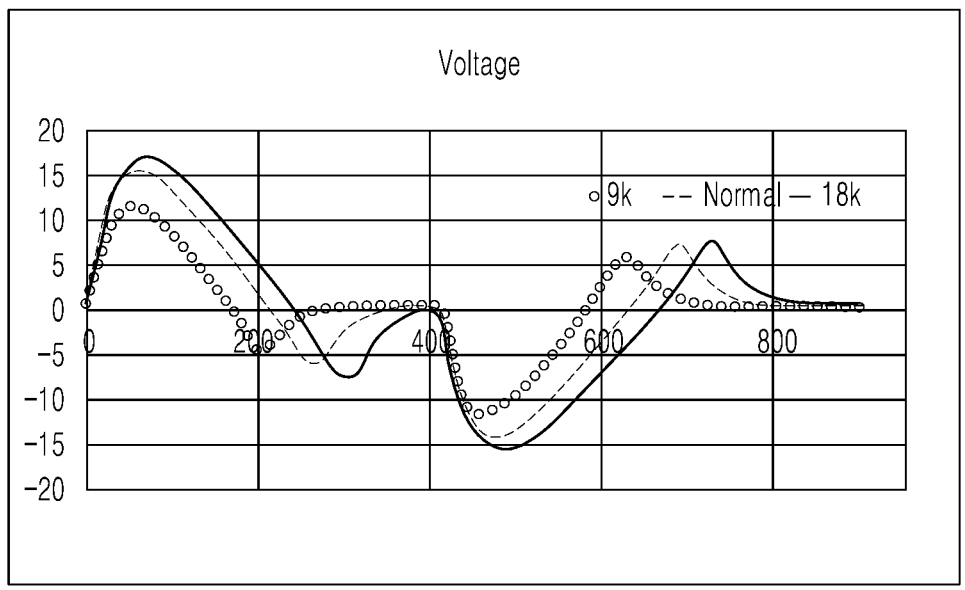
Figure 6C:
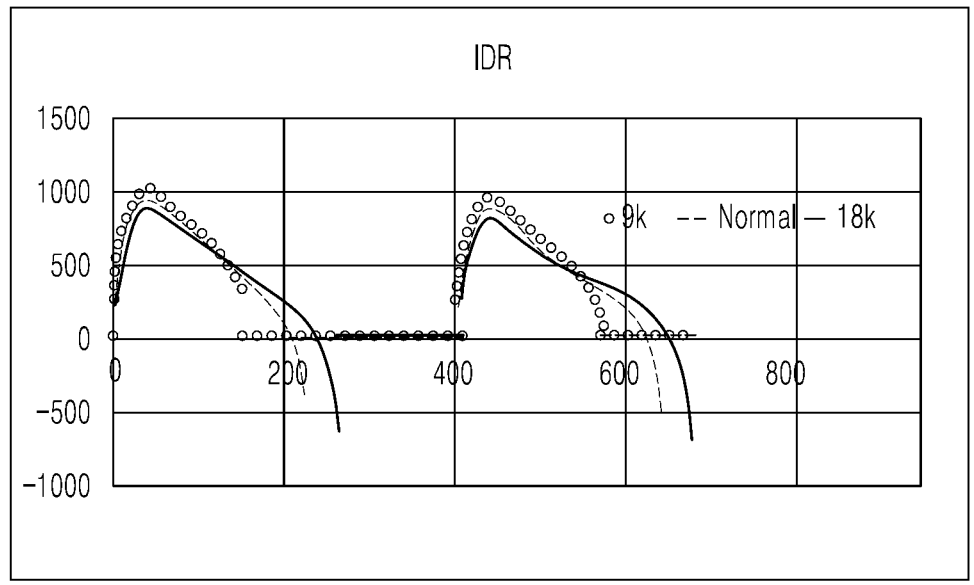
Figure 6D:
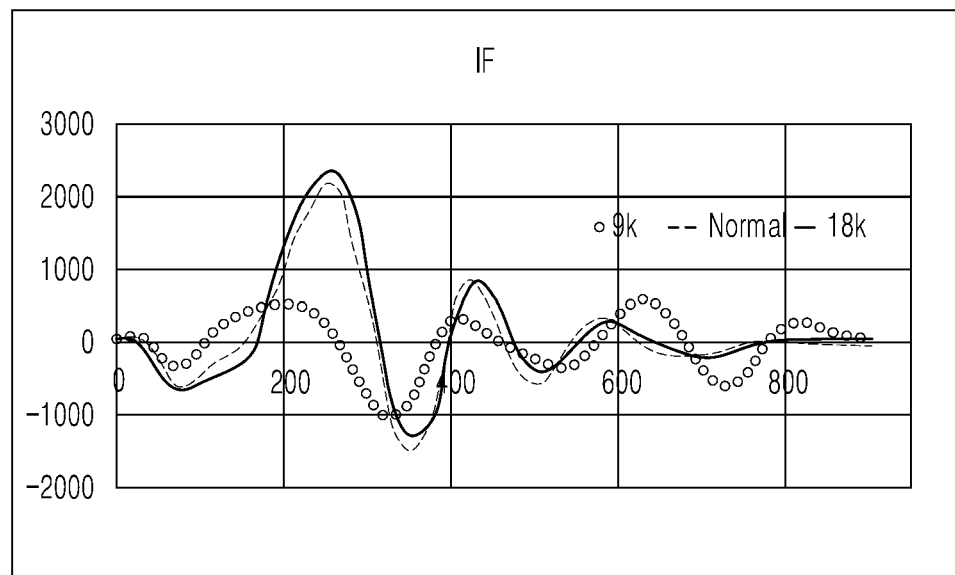
Figure 7A:
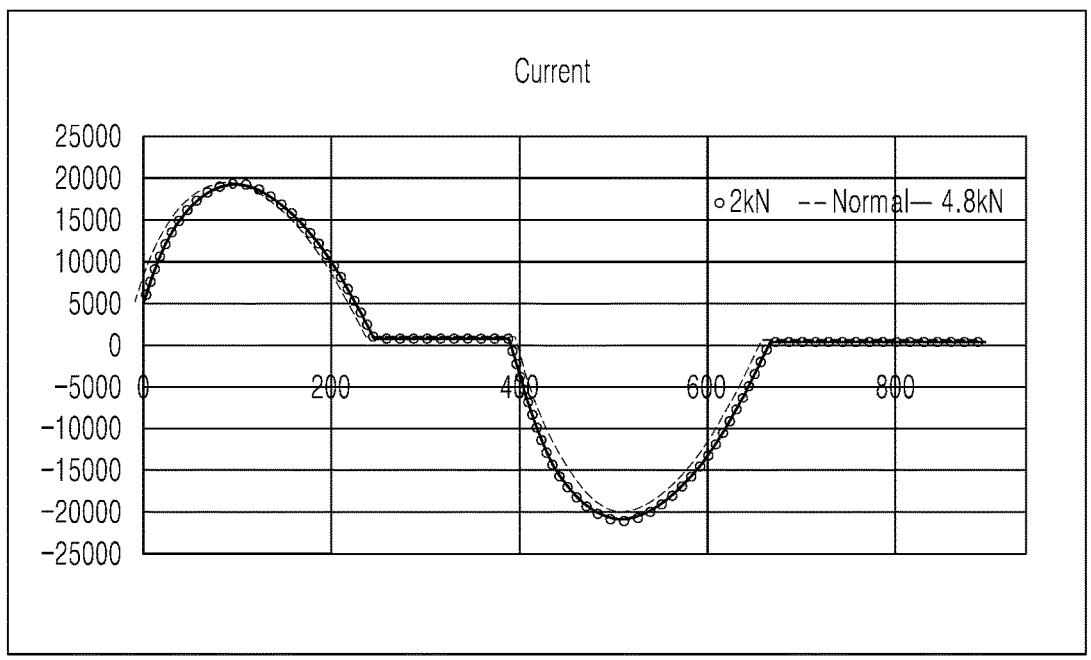
Figure 7B:
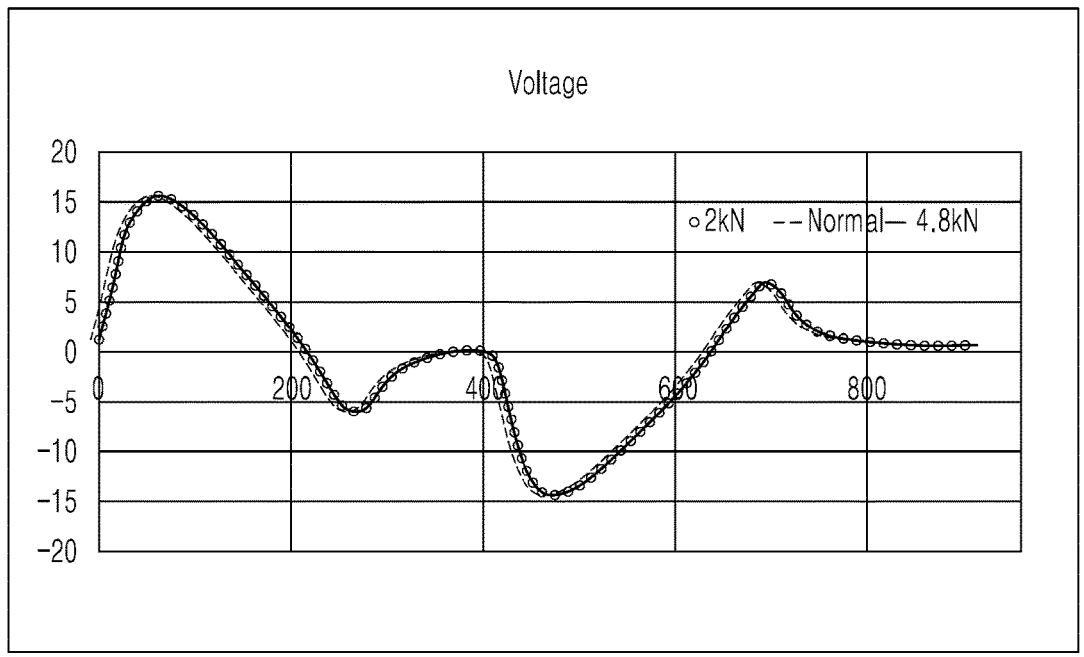
Figure 7C:
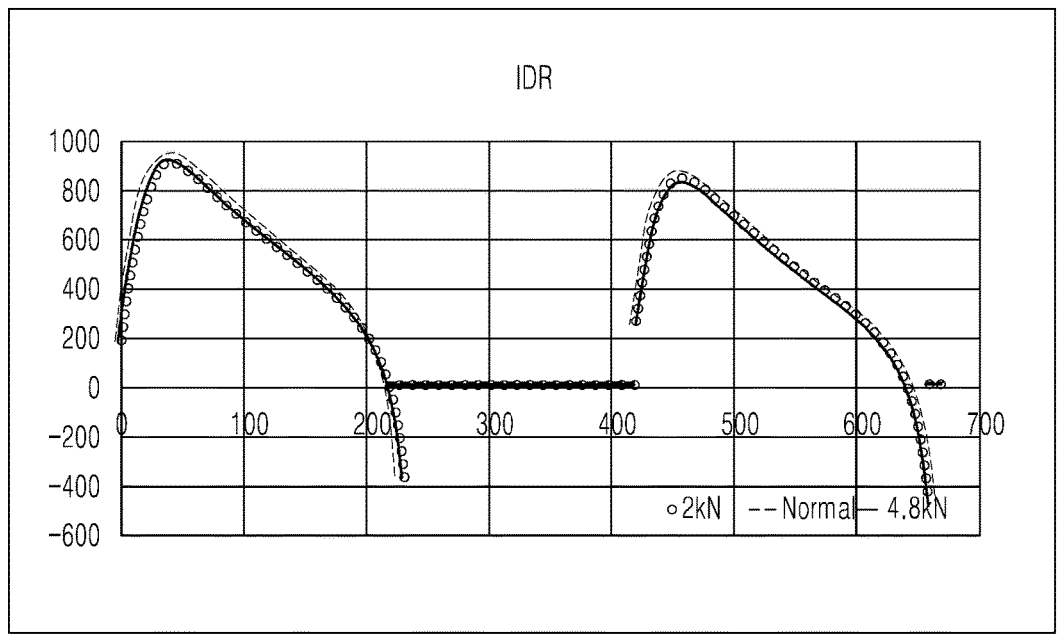
Figure 7D:
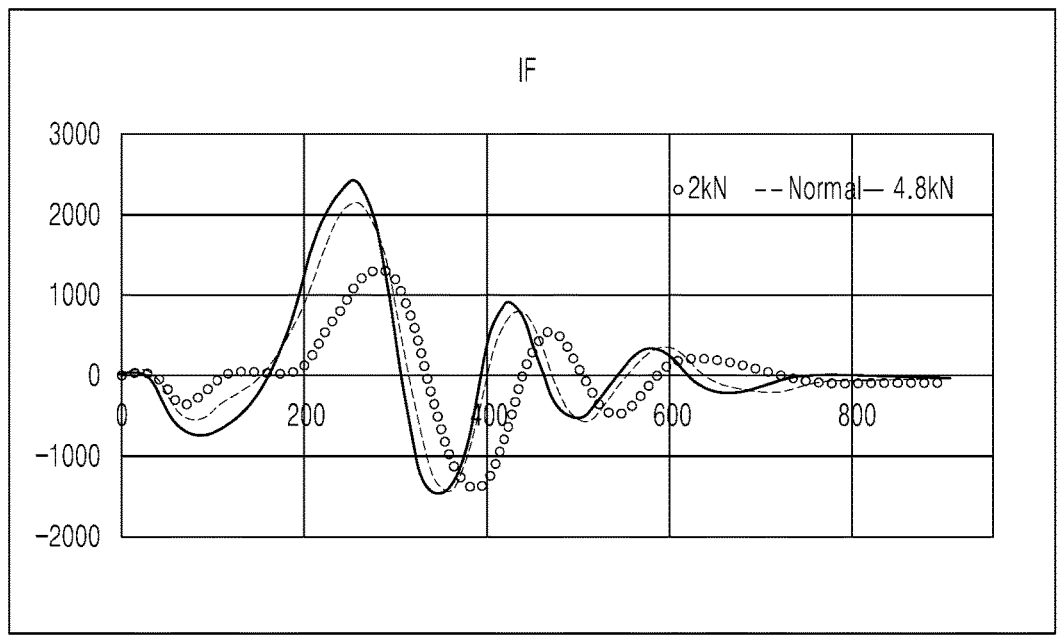
Figure 8A:
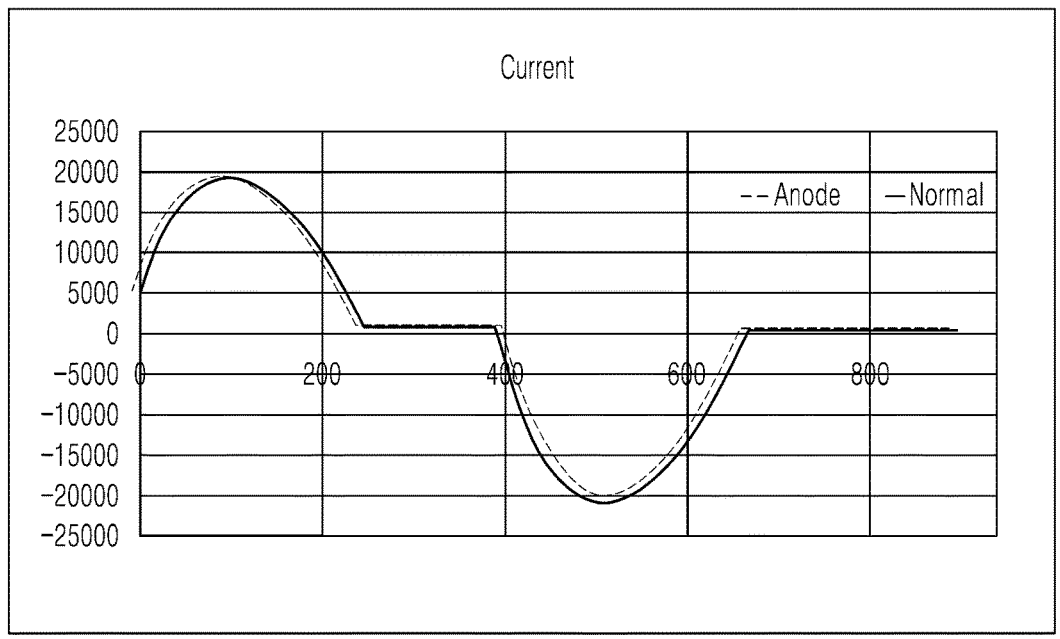
Figure 8B:
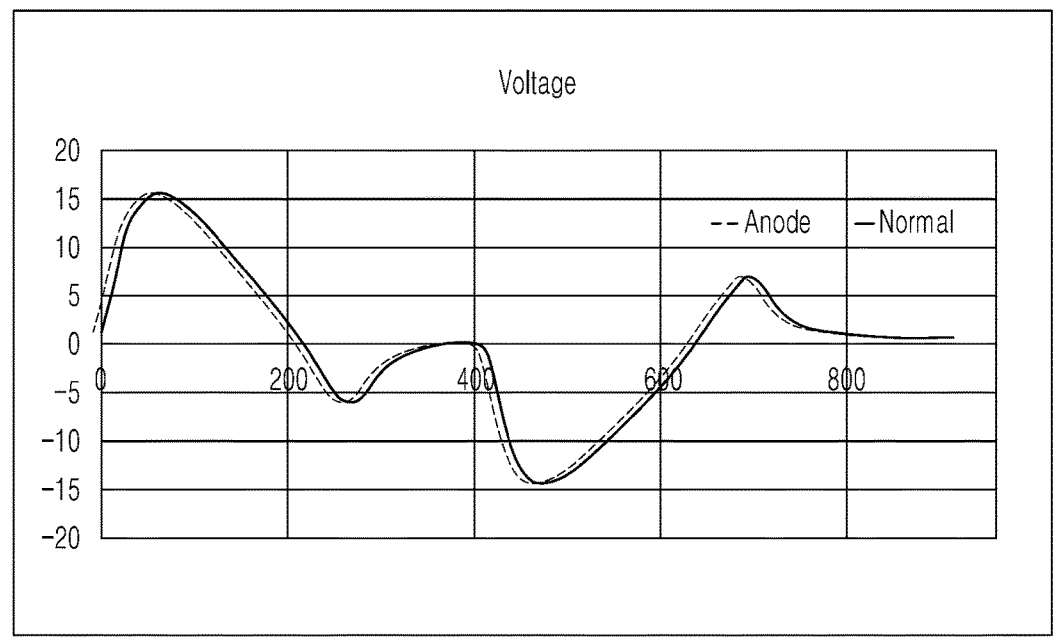
Figure 8C:
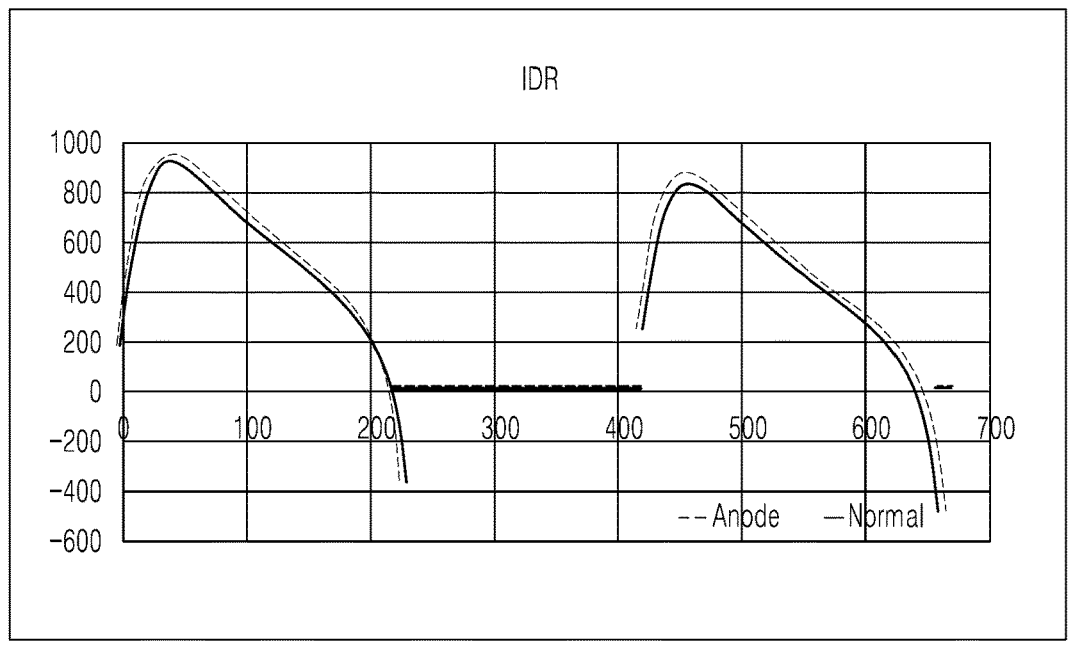
Figure 8D:
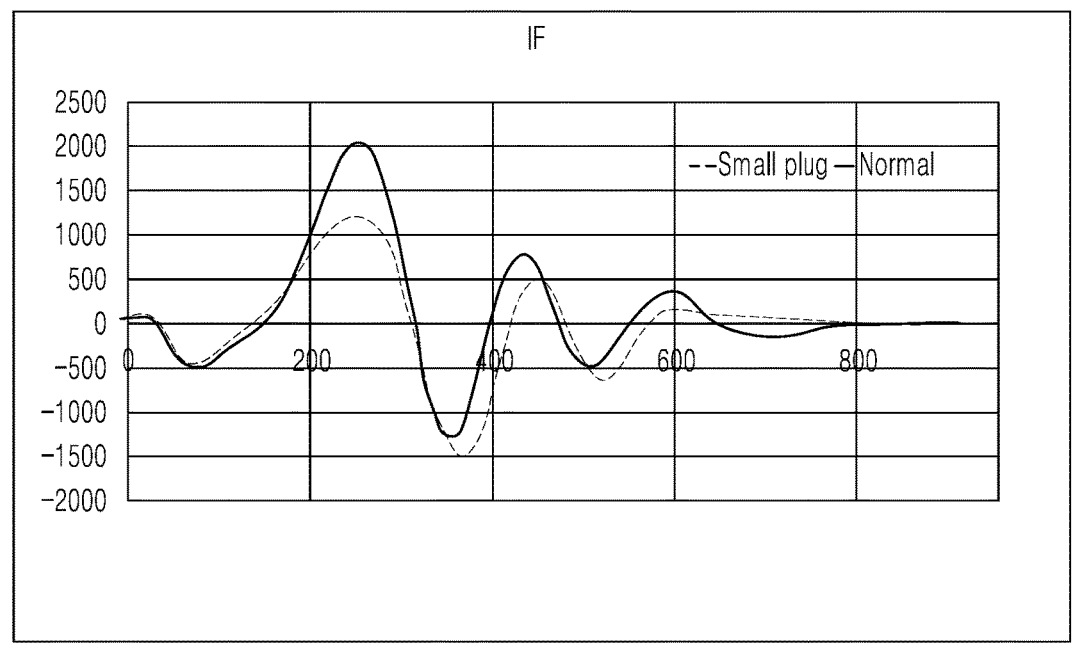
Figure 9A:
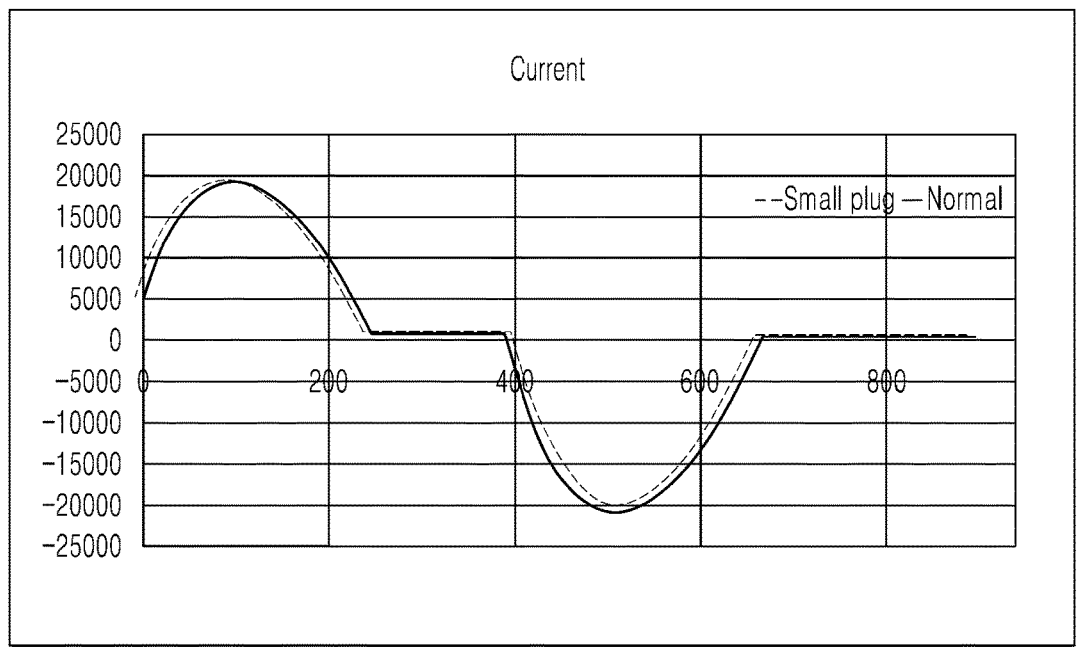
Figure 9B:
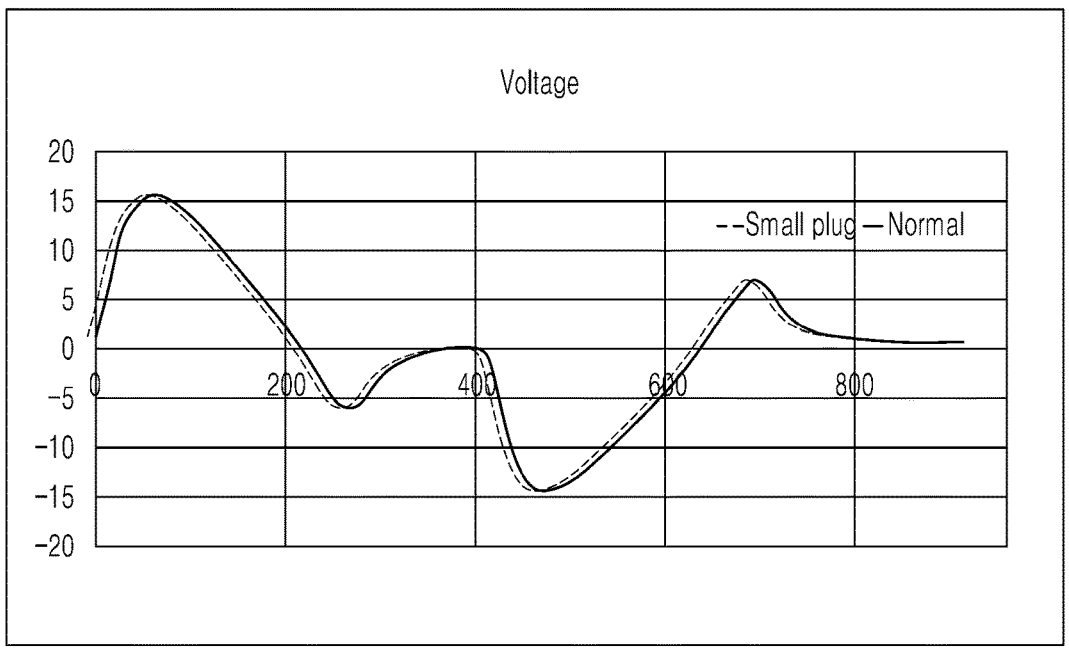
Figure 9C:
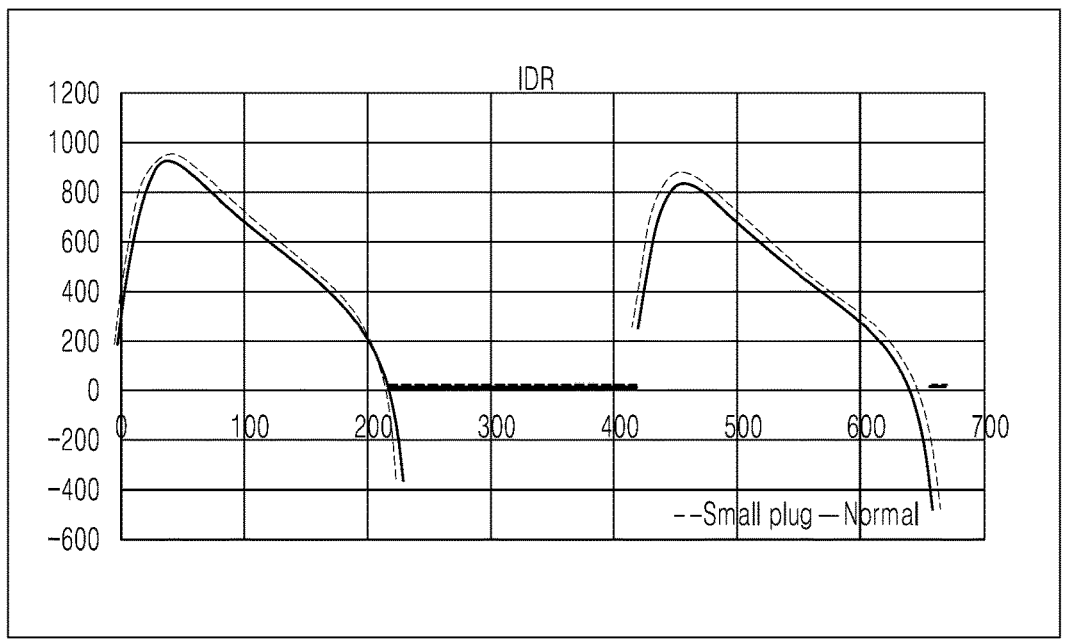
Figure 9D:
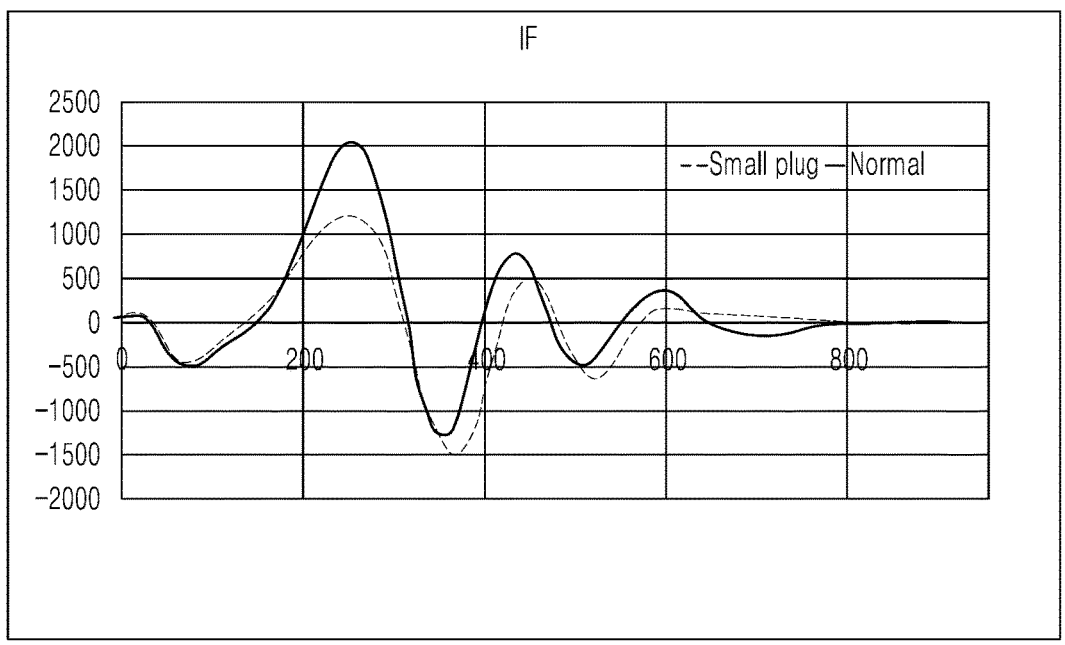
Figure 10A:
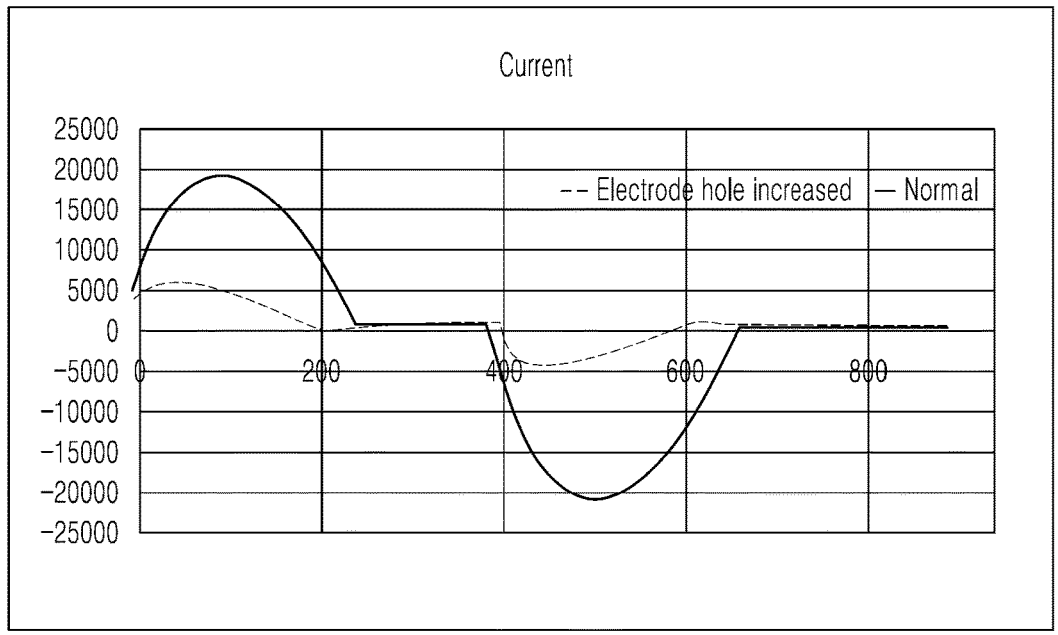
Figure 10B:
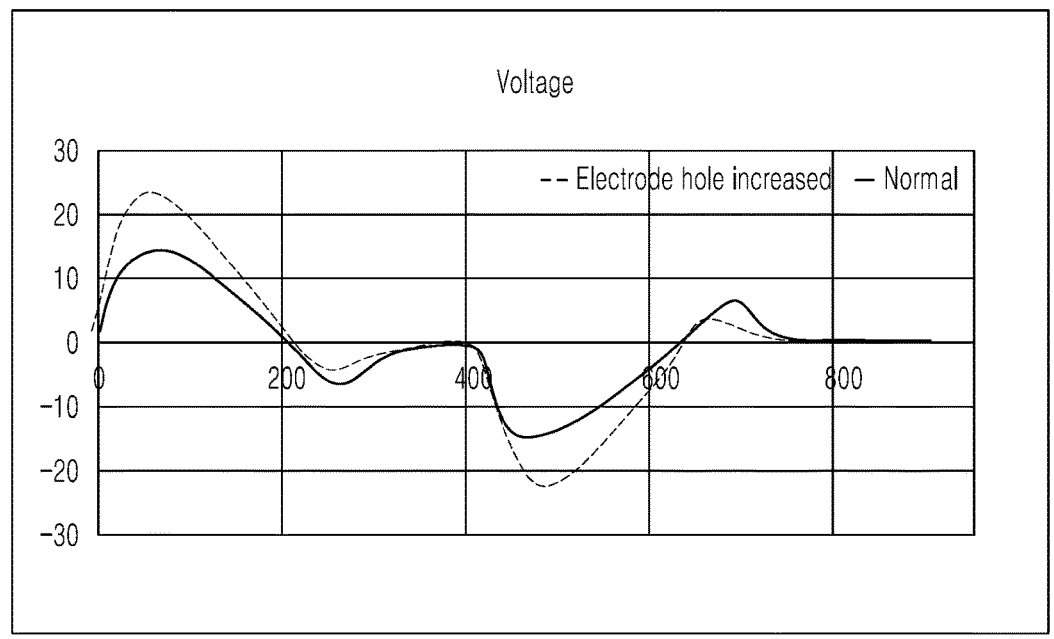
Figure 10C:
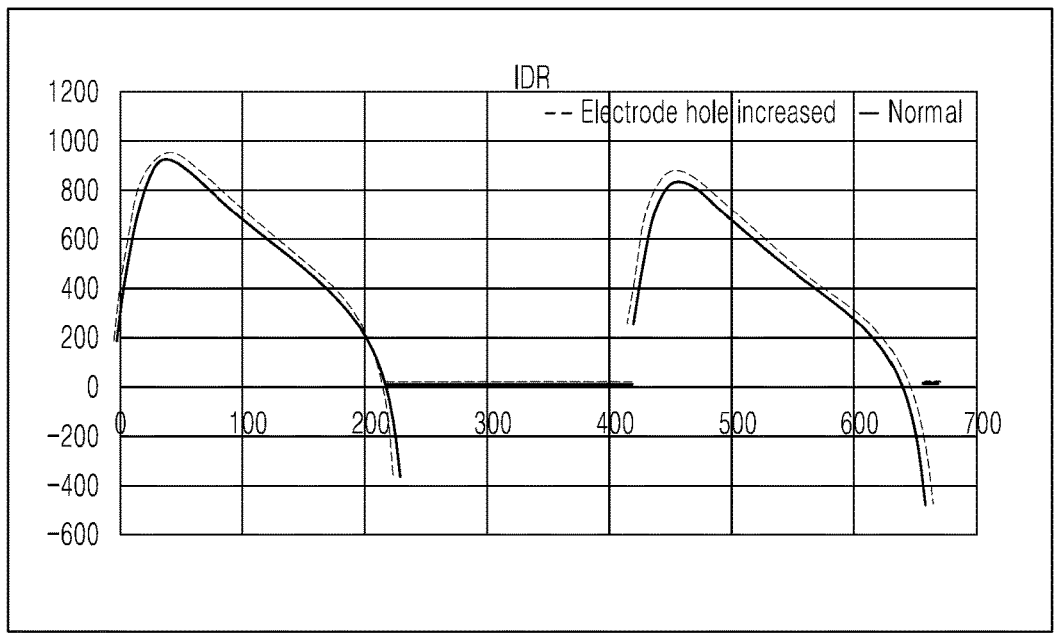
Figure 10D:
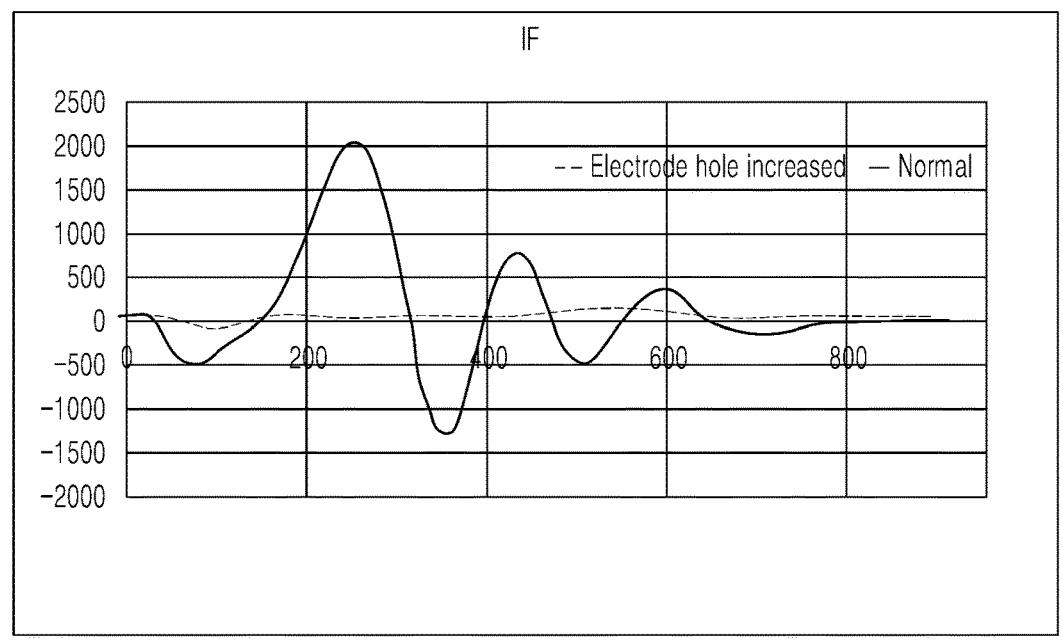
Figure 11A:
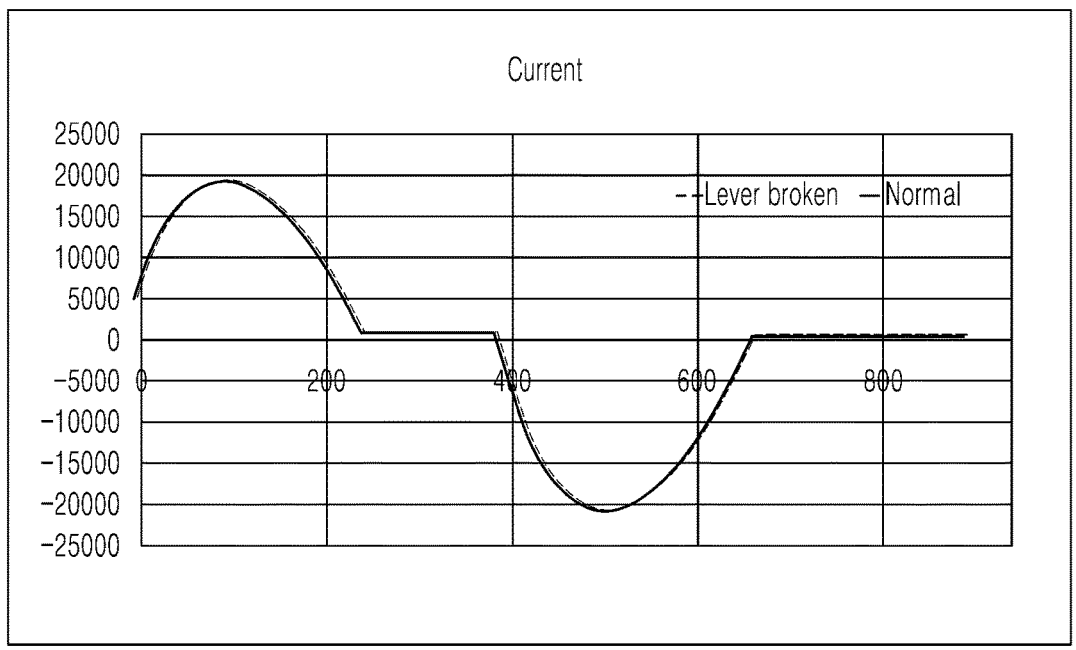
Figure 11B:
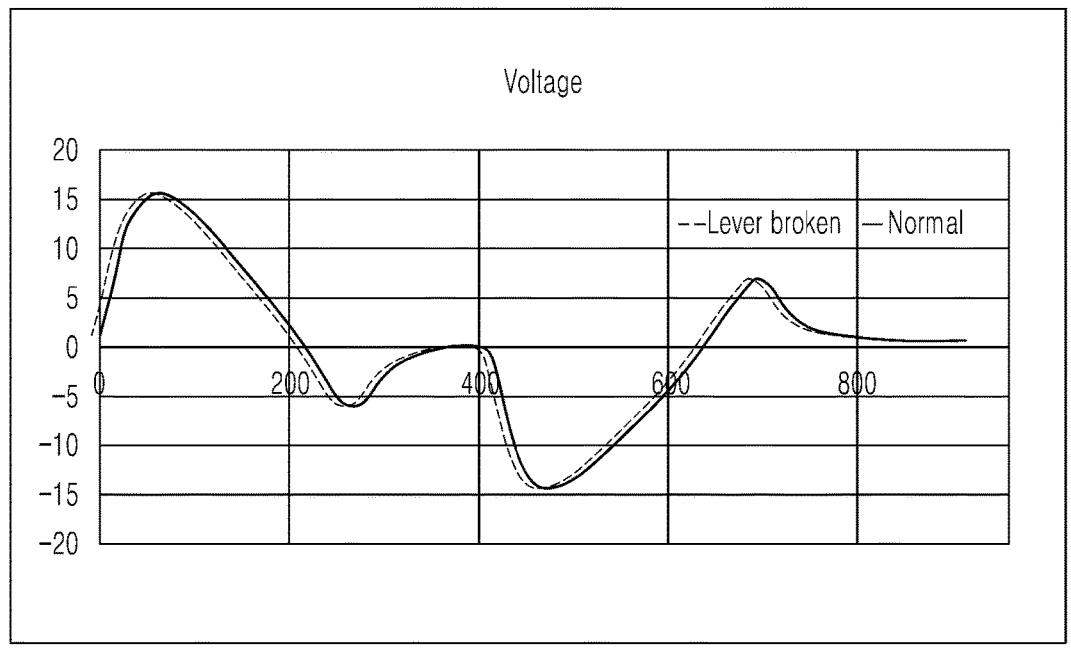
Figure 11C:
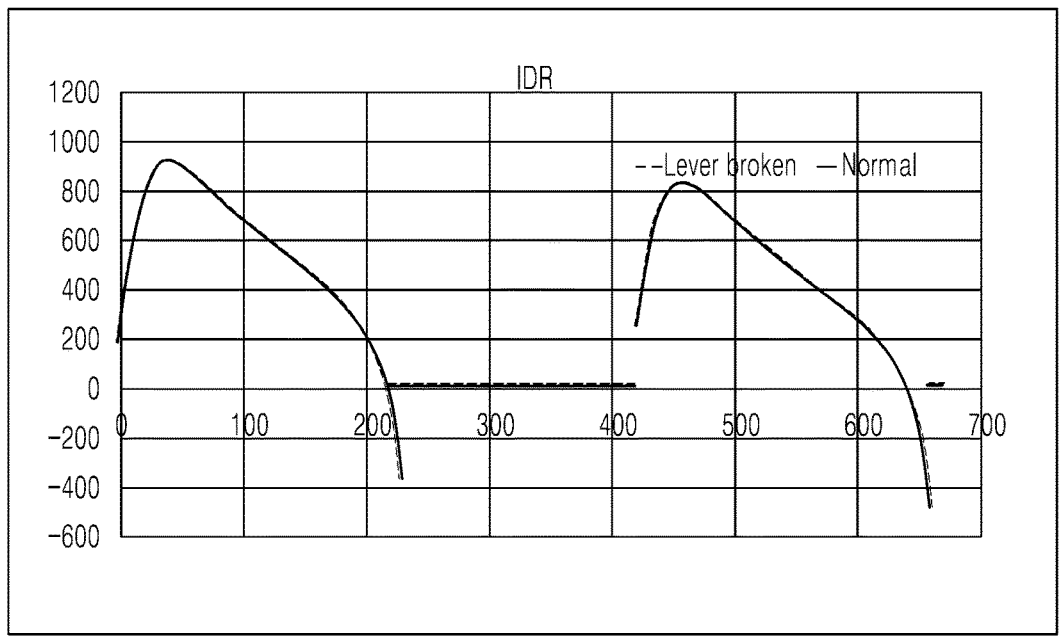
Figure 11D:
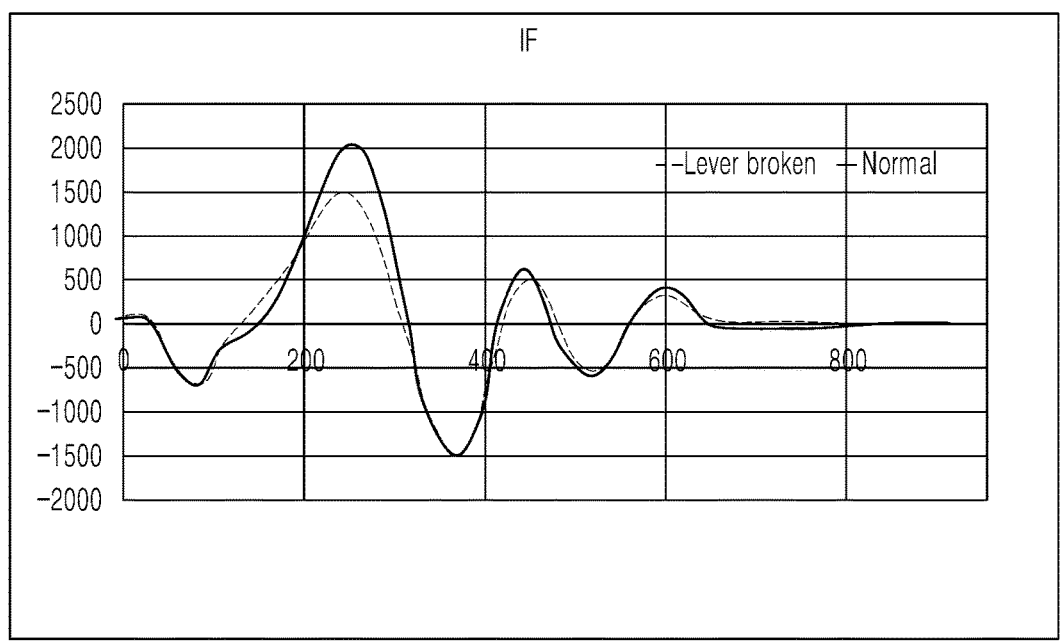
Figure 12A:
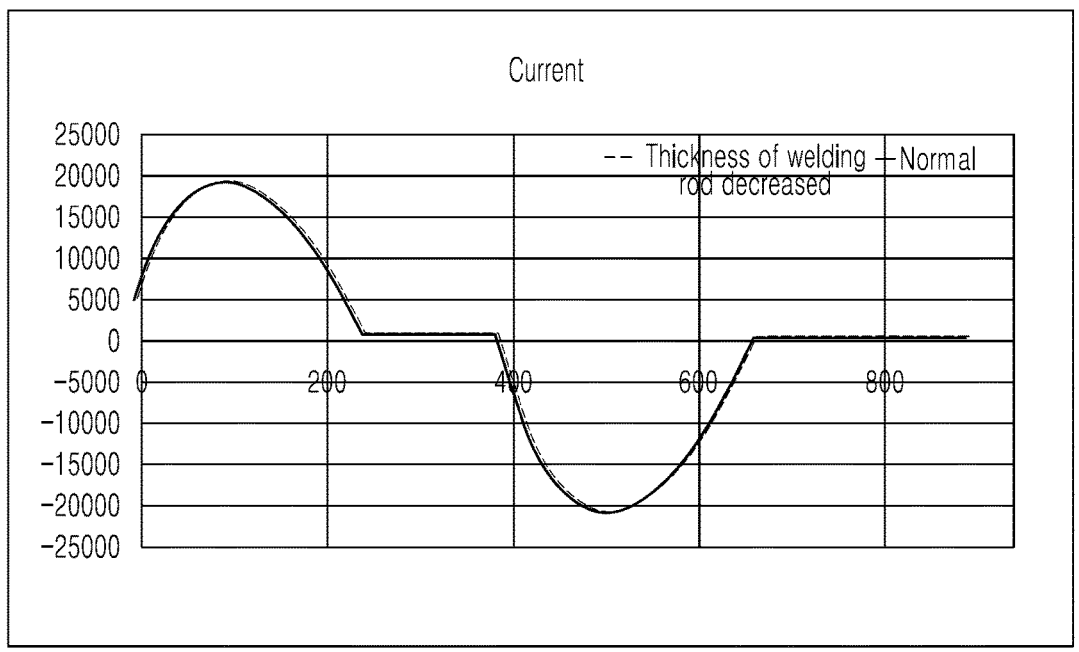
Figure 12B:
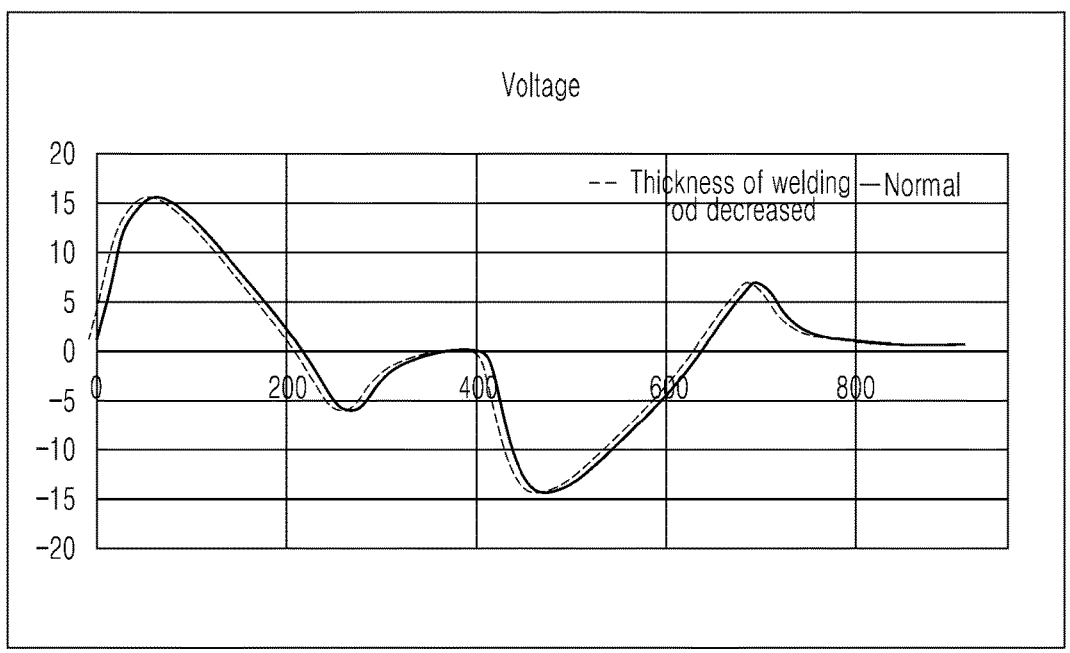
Figure 12C:
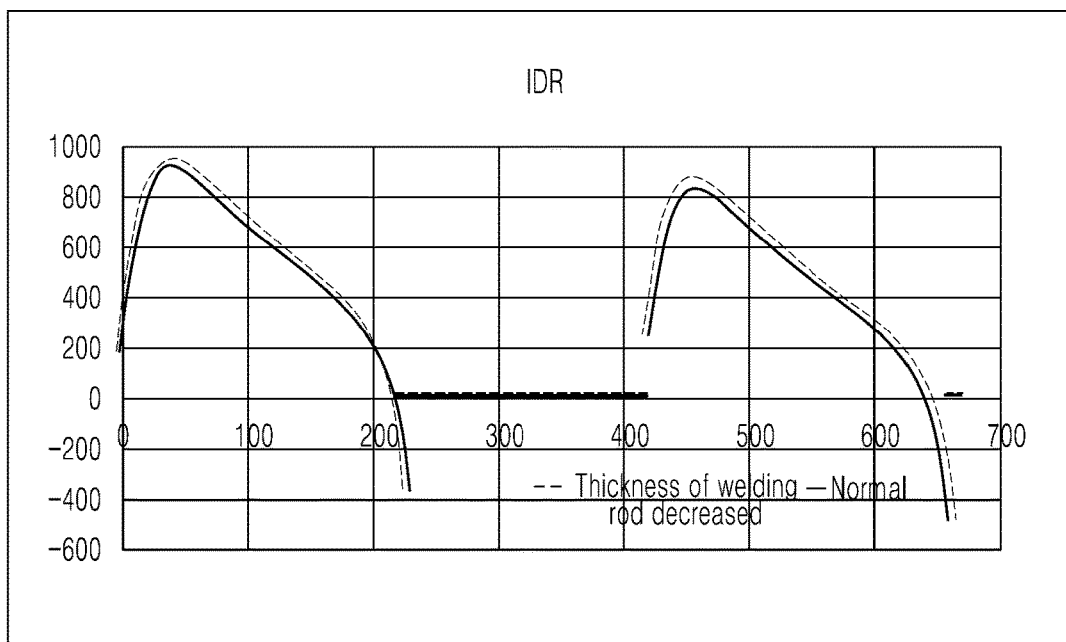
Figure 12D:
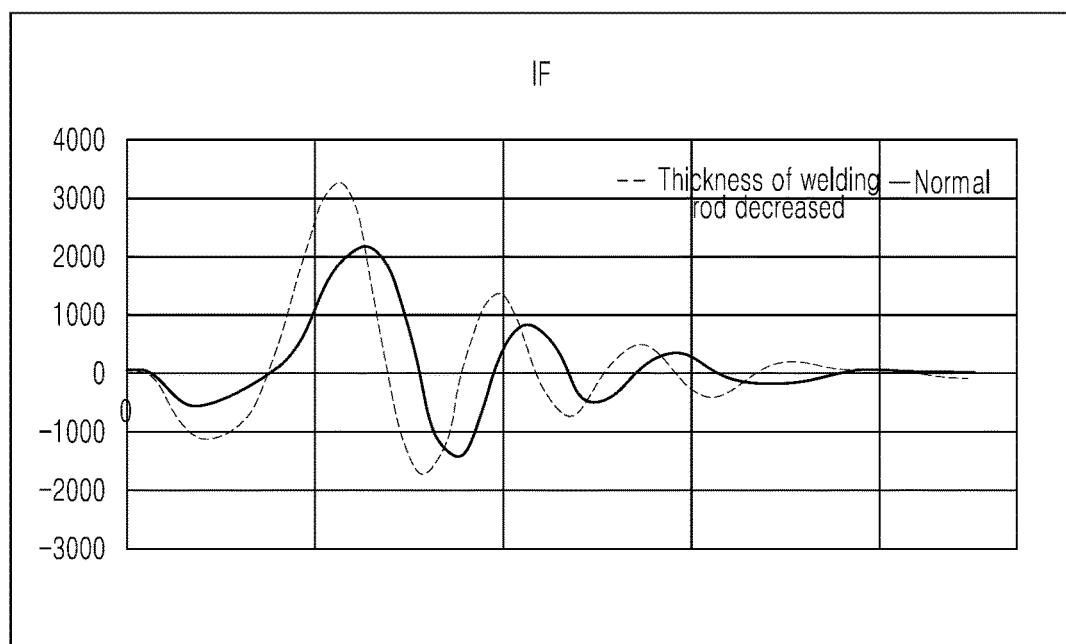
Figure 13A:
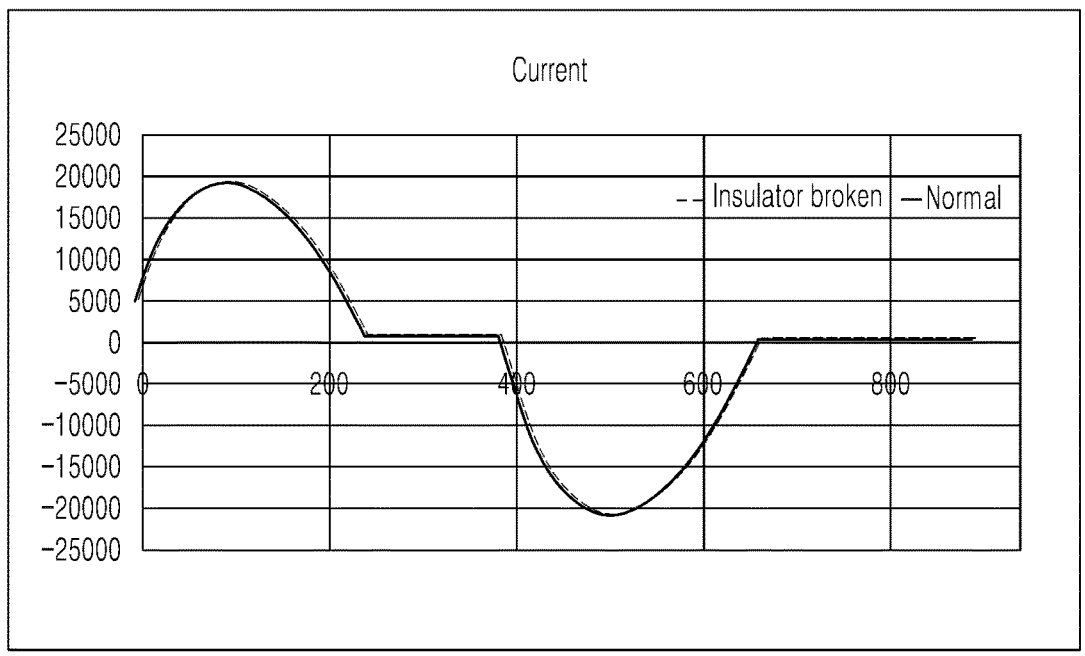
Figure 13B:
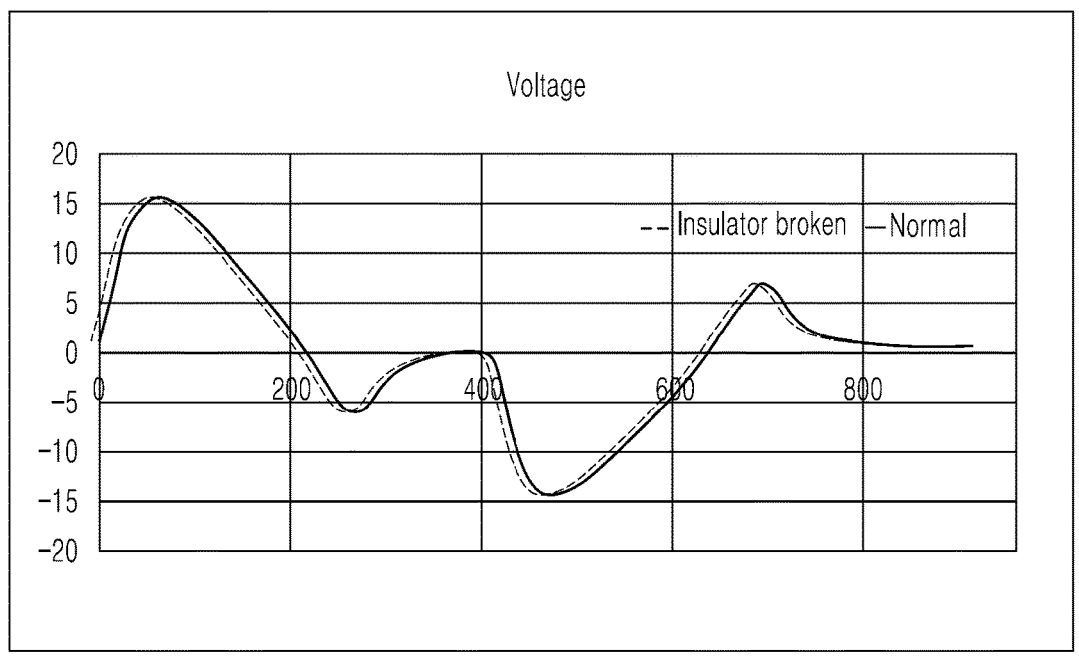
Figure 13C:
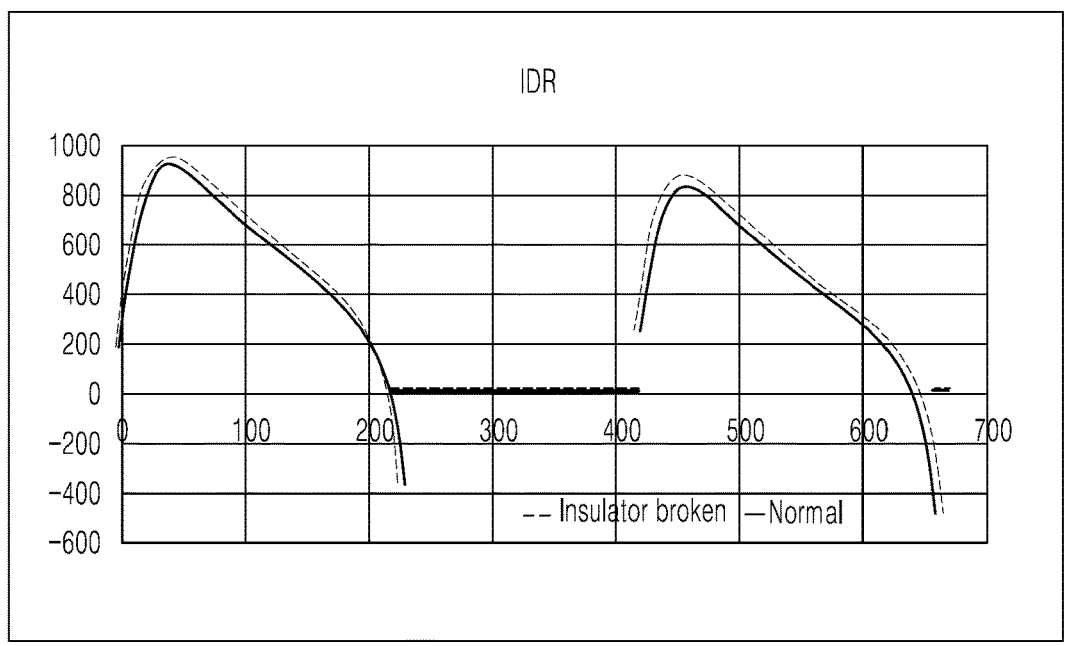
Figure 13D:
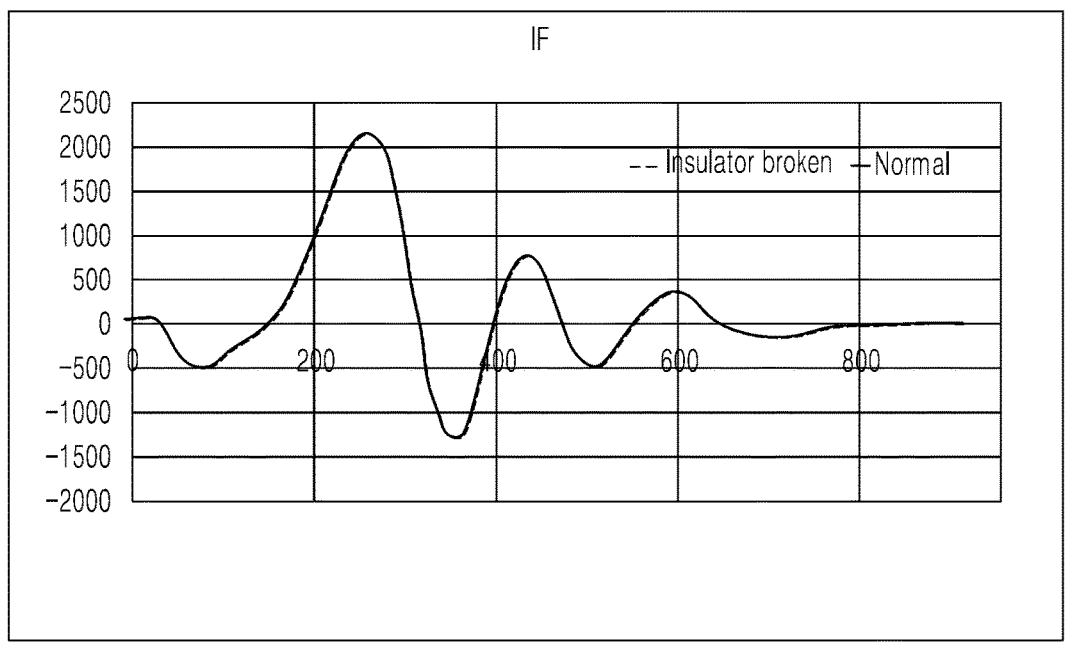

Referring to FIGS. 4 to 5F, the period A is a weld period where current starts flowing and increases, in which since the contact resistance at a welded portion is larger than bulk resistance, the temperature of the welded portion increases and ductility of the contact surface increases. Further, the welding force is larger than the resilient force of the spring 13 and the expansion force of the welded portion due to heat, so tensile stress is generated.

The period B is a weld period where the current continues decreasing, in which the temperature at the welded portion and the bulk portion increases, so the volume of the welded portion increases. The resilient force of the spring and the expansion force of the welded portion due to heat are larger than the welding force, so compressive stress is generated.

The period C is a cooling period without current flowing, in which the temperature at the welded portion decreases and the welded portion partially solidifies with reduction in volume of the welded portion. Further, the resilient force of the spring and the expansion force of the welded portion due the heat are larger than the welding force, tensile stress is generated, in which the tensile stress is less than the tensile stress at the period A.

The period D is a weld period where the current starts increasing, whereby the temperatures at the welded portion and the bulk portion increase and the volume of the welded portion increases. Further, the resilient force of the spring and the expansion force of the welded portion due the heat are larger than the welding force, so compressive stress is generated, in which the compressive stress is smaller than that at the period B.

Finally, the period E is a weld period where the current decreases, in which a welded portion is formed, surrounding bulk resistance increases, and small tensile stress is generated.

Since the cladding pipe and the end plug are welded at a short weld period of one cycle, they may be welded at a high frequency, and it is possible to more reliably determine quality, that is, whether there is defect or not by calculating the gradient of the instantaneous pressure BW2 together with the interval dynamic resistance BW0 and the gradient of the instantaneous dynamic resistance BW1.

In particular, the quality factors described above are classified in to static factors and dynamic factors for determining whether there is defect or not.

In detail, the static factors are current P1, voltage P2, the entire average dynamic resistance P4, and/or the entire average heat value P4 in the present invention. The static factors are primarily detected and compared with reference values, and then, if the factors do not satisfy a reference range, a defect is determined, or if the factors satisfy the reference range, the dynamic factors are compared with reference values, thereby secondarily determining a defect.

The dynamic factors include the interval dynamic resistance BW0, the gradient of instantaneous dynamic resistance BW1, and/or the gradient of instantaneous welding force BW2 in the present invention, and particularly, necessarily include the gradient of instantaneous welding force BW2.

Pattern Analysis on Poor Welding

Eight tests for representative poor welding conditions that cause poor welding or a crack in a welded portion were performed and can be simply shown in the following Table 1.

TABLE 1

| | | |
|---|---|---|
| Welding power | | Single-phase AC |
| Weld time (cycle) | | 1 |
| Overlapping (mm) | | 0.6~1.0 |
| Test 1 | Current (kA) | 9, 14*, 19 |
| Test 2 | Welding force (N) | 2000, 4300*, 4800 |
| Test 3 | Electrode state | Normal *, Anode |
| Test 4 | Diameter of end plug (mm) | 9.50, 9.85* |
| Test 5 | Diameter of electrode hole (mm) | Normal *, Increased |
| Test 6 | Breakage of pressure cylinder lever | Yes, No * |
| Test 7 | Thickness of welding rod | 0.58, 0.7* |
| Test 8 | Removal or not of insulator | Yes *, No |

The tests were performed under normal conditions and defect conditions (*) and the patterns of the quality factors described above were observed.

Test 1—Pattern of Quality Factor Due to Change in Weld Current

Referring to FIGS. 6A to 6D, it can be seen that as the weld current changes, patterns change in all of the current, voltage, instantaneous dynamic resistance (IDR), and instantaneous welding force (F) and it was observed that the change in the welding force was also influenced by heating value. It was observed that when welding was performed with high current (18 kA), the peak of the voltage was not high in comparison to a normal case, so the instantaneous welding force (IF) was also small, but not changed much by the heat value.

Table 2 shows pattern tendencies of the interval dynamic resistance BW0, the gradient of instantaneous dynamic resistance BW1, and the gradient of instantaneous welding force BW2, in which the directions of the arrows mean "larger" and "smaller" than normal conditions and the numbers of arrows mean the magnitude.

TABLE 2

| Condition | BW0 | BW1 | BW2 |
|---|---|---|---|
| Low current (9 kA) | ↑ | ↓ | ↓↓ |
| High current (18 kA) | ↓ | ≈ | ↑ |

Test 2—Pattern of Quality Factor Due to Change in Welding Force

Referring to FIGS. 7A to 7D, the tendencies of the current, voltage, and instantaneous dynamic resistance (IDR) according to a change in welding force were a little different, but it can be seen that the instantaneous welding force (IF) shows a remarkable tendency. Although the tendency was remarkable at lower welding force (2 kN), it was little different from a normal tendency at the maximum welding force (4.8 kN).

As can be seen from Table 3, it can be seen that the gradient of instantaneous welding force showed a remarkable tendency as compared with other quality factors.

TABLE 3

| Condition | BW0 | BW1 | BW2 |
|---|---|---|---|
| High welding force (4.8 kN) | ≈ | ≈ | ↓↓↓ |
| Low welding force (2 kN) | ≈ | ≈ | ↑↑ |

Test 3—Pattern of Quality Factor Due to Use of Anode

Referring to FIG. 8, when the degree of oxidation of an anode is severe, the current also shows a tendency to drop, but this test was performed within a range without a change in current. The current and the voltage did not change, but slight changes in the instantaneous dynamic resistance (IDR) and the instantaneous welding force (IF) were observed and the following Table 4 shows the tendencies.

TABLE 4

| Condition | BW0 | BW1 | BW2 |
|---|---|---|---|
| Anode | ≈ | ↑ | ↓ |

Test 4—Pattern of Quality Factor According to Decrease in Diameter of End Plug

Referring to FIGS. 9A to 9D, it can be seen that when a end plug and a cladding pipe having a small diameter were welded, there were little changes in current and voltage, but the instantaneous welding force (IF) showed a remarkable tendency.

It can be seen from the following Table 5 that the gradient of instantaneous welding force BW2 that is a dynamic factor considerably changed in comparison to other quality factors.

TABLE 5

| Condition | BW0 | BW1 | BW2 |
|---|---|---|---|
| Small end plug | ≈ | ≈ | ↓↓↓ |

Test 5—Pattern of Quality Factor by Large-Diameter Electrode Hole

The electrode is made of a copper alloy in a large-diameter electrode hole, so it is soft and can be easily worn, and there is a large tolerance in diameter of a cladding tube. Accordingly, this test was performed to reproduce defect when welding was performed at a large-diameter electrode hole. Referring to FIGS. 10A to 10D, when an electrode holes was large, the electrode could not firmly fix the cladding tube, so current became unstable and little instantaneous welding force (IF) was shown. In this test, since a static current welding machine was used, it can be seen that the voltage increased to the maximum to compensate for the drop of current. Thus there was no large difference in the pattern of the dynamic resistance.

TABLE 6

| Condition | BW0 | BW1 | BW2 |
|---|---|---|---|
| Diameter of electrode hole | ↓↓ | ≈ | ↓↓ |

Test 6—Pattern of Quality Factor Due to Breakage of Electrode-Carrying Cylinder Lever The electrode-carrying cylinder lever that fixes an electrode and a cladding tube plays an important role in welding. However, fatigue failure may be caused by repeated load, so it is very difficult to find out the fatigue failure and maintain the electrode-carrying cylinder lever. Accordingly, this test was performed after artificially removing the portion where fatigue failure occurred and the lever was extremely bent to find out the type of defect.

Referring to FIGS. 11A to 11D, there was no large change in current, voltage, and dynamic resistance, but instantaneous welding force (IF) showed a tendency. As can be seen from the following Table 7, it can be seen that the gradient of instantaneous welding force BW2 of the dynamic factors showed a considerably large tendency.

TABLE 7

| Condition | BW0 | BW1 | BW2 |
|---|---|---|---|
| Breakage of lever | ≈ | ≈ | ↓↓ |

Test 7—Pattern of Quality Factor Due to Decrease in Thickness of Fuel Rod

A tap was formed at an end of a cladding tube before a fuel rod and an end plug were welded for easy contact with the end plug in welding. Machining is performed with a uniform thickness, but if machining is concentrated on a portion or is excessively performed too much and welding, welding cracks may be caused. Accordingly, this test was conducted on influence by a decrease in thickness of a fuel rod.

Referring to FIGS. 12A to 12D, there was no large difference in current, voltage, and dynamic resistance, but instantaneous welding force (IF) showed a tendency.

As can be seen from the following Table 8, it can be seen that the gradient of instantaneous welding force BW2 of the dynamic factors showed a considerably large tendency, as compared with other quality factors.

TABLE 8

| Condition | BW0 | BW1 | BW2 |
|---|---|---|---|
| Decrease in diameter of fuel rod | ≈ | ≈ | ↑↑↑ |

Test 8—Pattern of Quality Factor Due to Breakage of Insulator

An electric leak is intermittently generated due to breakage of an insulator for fastening a bus bar. A test was performed with an insulator removed to reproduce this phenomenon. The test was performed without the bolt and insulator for two lower terminals of four terminals. Tendencies were not clear in this test. This is determined in accordance with whether there is a bolt or not, and it is considered that this is because welding was performed with a bolt removed when inserting an insulator at a joint with a bolt, so the possibility of an electric leak is low. However, as can be seen from the following Table 9, the interval dynamic resistance BW0 showed a tendency, which is small though.

TABLE 9

| Condition | BW0 | BW1 | BW2 |
|---|---|---|---|
| Breakage of insulator | ↓ | ≈ | ≈ |

Figure 14:
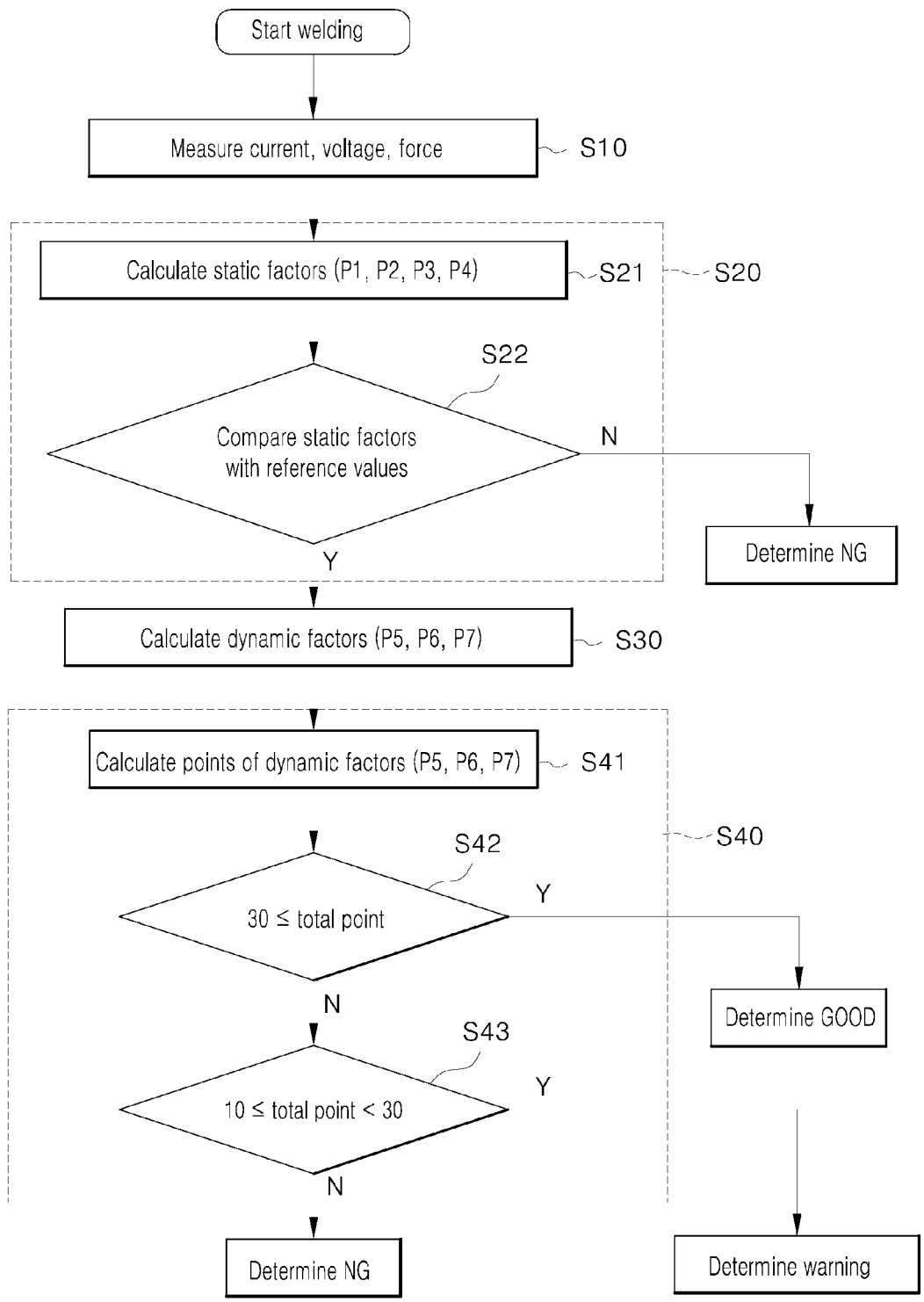
FIG. 14 is a flowchart illustrating a monitoring method of the present invention.

FIG. 14 is a flowchart illustrating a monitoring method of the present invention.

Referring to FIG. 14, a method of monitoring resistance welding quality of a nuclear fuel rod of the present invention includes: a first step of detecting welding information including voltage, current, and welding force in a process of pressure resistance welding of a cladding tube and an end plug (S10); a second step of comparing static factors obtained by calculating effective values for the welding information with predetermined reference values, respectively (S20); a third step of calculating dynamic factors for welding information including the gradient of instantaneous welding force (S30), when the reference values are satisfied in the second step (S20); and a fourth step of determining whether there is defect or not in welding quality by comparing the dynamic factors (S40).

In the first step (S10), while pressure resistance welding is performed on a cladding tube and an end plug, sensors detect welding information including voltage, current, and welding force, and the welding information is transmitted to the monitoring unit 200.

The second step (S20) is composed of a step of obtaining static factors P1, P2, P3, and P4 by calculating effective values for the welding information (S21) and a step of comparing the static factors P1, P2, P3, and P4 with predetermined reference values, respectively (S22). When the static factors P1, P2, P3, and P4 are out of the reference ranges of the reference values, it is determined that there is defect.

In the third step (S30), when the reference value ranges are satisfied in the second step (S20), dynamic factors P5, P6, and P7 for the welding information including the gradient of instantaneous welding force are calculated.

In the fourth step (S40), whether there is defect or not in welding quality is determined by comparing the dynamic factors P5, P6, and P7.

The fourth step (S40) may include a step of calculating the total sum of values by quantifying the patterns of dynamic factors (S41). For example, as described in the tests, when dynamic factors are in the normal ranges, 10 points is given, but when they are not in the normal ranges, 0 point is given, whereby the total point of the quality factors can be obtained.

Next, whether there is defect or not in welding quality is determined by comparing the total point of the dynamic factors with a predetermined reference value. In this embodiment, 'normal' is determined when the total point is 30 or more points (S42), 'warning' is determined when the total point is in the range of 10 to 30 points (S43), and 'defect' is determined when the total point is 10 or less points.

When the patterns of the dynamic factors are quantified in the process of calculating the total point of the dynamic factors, weight may be given to the dynamic factors.

In this embodiment, as can be seen from the tests, it can be seen that the gradient of instantaneous welding force of a plurality of quality factors is very effective for determining poor quality, and accordingly, whether there is defect or not can be determined by giving larger weight to the gradient of instantaneous welding force when calculating the total point.

It will be apparent to those skilled in the art that the foregoing present invention is not limited by the foregoing embodiments and the accompanying drawings, and various modifications and changes may be made without departing from the scope and spirit of the invention.

What is claimed is:

1. A method of monitoring resistance welding quality of a nuclear fuel rod using a resistance welding apparatus, the resistance welding apparatus including
   a tube electrode configured to contact a cladding tube of the nuclear fuel rod,
   a plug electrode configured to contact an end plug of the nuclear fuel rod,
   a current sensor for detecting welding current,
   a voltage sensor for detecting welding voltage,
   a welding force sensor for detecting welding force applied to the end plug, and
   a monitoring unit monitoring welding quality in real time by processing detected signals,
   the method comprising:
   providing the cladding tube to be inserted in the tube electrode and aligning the end plug on the cladding tube to come in contact with the cladding tube at one side of the end plug while an opposite side of the end plug is supported by the plug electrode;
   supplying alternating current (AC) electric power to the tube electrode and the plug electrode during a welding time such that the welding current flows through the tube electrode, the cladding tube, the end plug and the plug electrode, and moving the plug electrode such that the welding force is applied to the end plug, thereby welding the end plug to the cladding tube;
   detecting, at every predetermined sample cycle by the monitoring unit, the welding current using the current sensor, the welding voltage applied between the tube electrode and the plug electrode using the voltage sensor, and the welding force using the welding force sensor;

calculating, by the monitoring unit, an entire effective current value, an entire effective voltage value, an entire average dynamic resistance, and an entire average heating value, wherein the entire effective current value is an effective current of the welding current for the welding time, the entire effective voltage value is an effective voltage of the welding voltage for the welding time, the entire average dynamic resistance value is calculated using the entire effective current value and the entire effective voltage value, and the entire average heating value is calculated using the entire effective current value, the entire effective voltage value and the welding time;

comparing, by the monitoring unit, the entire effective current value, the entire effective voltage value, the entire average dynamic resistance value and the entire average heating value with predetermined reference values, respectively, wherein when the entire effective current value, the entire effective voltage value, the entire average dynamic resistance and the entire average heating value are not within a reference range of the predetermined reference values, respectively, the welding is determined to be defective;

calculating, by the monitoring unit, an interval dynamic resistance value, a gradient value of instantaneous dynamic resistances, and a gradient value of instantaneous welding forces, wherein the interval dynamic resistance value is calculated using an interval effective current and an interval effective voltage, the interval effective current value being an effective current of the welding current for each half cycle of the AC electric power, and the interval effective voltage value being an effective voltage of the welding voltage for said each half cycle of the AC electric power, the gradient value of the instantaneous dynamic resistances is an average gradient of the instantaneous dynamic resistances for said each half cycle of the AC electric power, each of the instantaneous dynamic resistances being calculated using the welding current and the welding voltage at said every predetermined sample cycle, the gradient value of the instantaneous welding forces is an average gradient of the instantaneous welding forces for said each half cycle of the AC electric power, each of the instantaneous welding forces being the welding force detected by the welding force sensor at said every predetermined sample cycle; and comparing, by the monitoring unit, the interval dynamic resistance value, the gradient value of the instantaneous dynamic resistances and the gradient value of the instantaneous welding forces with a preset interval dynamic resistance value, a preset gradient value of instantaneous dynamic resistances, and a preset gradient value of instantaneous welding forces, respectively, wherein when the interval dynamic resistance value, the gradient value of the instantaneous dynamic resistances and the gradient value of the instantaneous welding forces are not within a predetermined range of the preset interval dynamic resistance value, the preset gradient value of instantaneous dynamic resistances, and the preset gradient value of instantaneous welding forces, respectively, the welding is determined to be defective.

2. The method of claim 1, wherein the gradient value of the instantaneous welding forces is the average gradient of the instantaneous welding forces at a first half cycle of the AC electric power.

3. The method of claim 1, wherein the performing of the welding includes forming a welding bead protruding in a ring shape at welded portion between the cladding tube and the end plug.

4. The method of claim 1, wherein the welding force sensor is a load cell, and the load cell includes a welding force indicator.

5. A method of monitoring resistance welding quality of a nuclear fuel rod using a resistance welding apparatus, the resistance welding apparatus including a tube electrode configured to contact a cladding tube of the nuclear fuel rod, a plug electrode configured to contact an end plug of the nuclear fuel rod, a current sensor for detecting welding current, a voltage sensor for detecting welding voltage, a welding force sensor for detecting welding force applied to the end plug, and a monitoring unit monitoring welding quality in real time by processing detected signals, the method comprising:

providing the cladding tube to be inserted in the tube electrode and aligning the end plug on the cladding tube to come in contact with the cladding tube at one side of the end plug while an opposite side of the end plug is supported by the plug electrode;

supplying alternating current (AC) electric power to the tube electrode and the plug electrode during a welding time such that the welding current flows through the tube electrode, the cladding tube, the end plug and the plug electrode, and moving the plug electrode such that the welding force is applied to the end plug, thereby welding the end plug to the cladding tube;

detecting, at every predetermined sample cycle by the monitoring unit, the welding current using the current sensor, the welding voltage applied between the tube electrode and the plug electrode using the voltage sensor, and the welding force using the welding force sensor;

calculating, by the monitoring unit, an entire effective current value, an entire effective voltage value, an entire average dynamic resistance, and an entire average heating value, wherein the entire effective current value is an effective current of the welding current for the welding time, the entire effective voltage value is an effective voltage of the welding voltage for the welding time, the entire average dynamic resistance value is calculated using the entire effective current value and the entire effective voltage value, and the entire average heating value is calculated using the entire effective current value, the entire effective voltage value and the welding time;

comparing, by the monitoring unit, the entire effective current value, the entire effective voltage value, the entire average dynamic resistance value and the entire average heating value with predetermined reference values, respectively, wherein when the entire effective current value, the entire effective voltage value, the entire average dynamic resistance and the entire average heating value are not within a reference range of the predetermined reference values, respectively, the welding is determined to be defective;

calculating, by the monitoring unit, an interval dynamic resistance value, a gradient value of instantaneous dynamic resistances, and a gradient value of instantaneous welding forces, wherein the interval dynamic resistance value is calculated using an interval effective current and an interval effective voltage, the interval effective current value being an effective current of the welding current for each half cycle of the AC electric power, and the interval effective voltage value being an effective voltage of the welding voltage for said each half cycle of the AC electric power, the gradient value of the instantaneous dynamic resistances is an average gradient of the instantaneous dynamic resistances for said each half cycle of the AC electric power, each of the instantaneous dynamic resistances being calculated using the welding current and the welding voltage at said every predetermined sample cycle, the gradient value of the instantaneous welding forces is an average gradient of the instantaneous welding forces for said each half cycle of the AC electric power, each of the instantaneous welding forces being the welding force detected by the welding force sensor at said every predetermined sample cycle; and comparing, by the monitoring unit, the interval dynamic resistance value, the gradient value of the instantaneous dynamic resistances and the gradient value of the instantaneous welding forces with a preset interval dynamic resistance value, a preset gradient value of instantaneous dynamic resistances, and a preset gradient value of instantaneous welding forces, respectively, wherein when the interval dynamic resistance value is within a predetermined range of the preset interval dynamic resistance value, a first quantified value is added to a total quantified value, when the gradient value of the instantaneous dynamic resistances is within a predetermined range of the preset gradient value of instantaneous dynamic resistances, a second quantified value is added to the total quantified value, when the gradient value of the instantaneous welding forces is within a predetermined range of the preset gradient value of instantaneous welding forces, a third quantified value is added to the total quantified value, and when the total quantified value is greater than a predetermined total quantified value, the welding is determined to be normal.

6. The method of claim 5, wherein when the total of the first, second and third quantified values is less than the predetermined total quantified value, the welding is defective or warning depending on a level of the total.

7. The method of claim 5, wherein the first quantified value, the second quantified value and the third quantified value are weighted.

* * * * *